United States Patent
Vadlamani et al.

(10) Patent No.: US 7,558,783 B2
(45) Date of Patent: Jul. 7, 2009

(54) CONVERSION BETWEEN APPLICATION OBJECTS AND SMART CLIENT OBJECTS

(75) Inventors: Viswanath Vadlamani, Sammamish, WA (US); Jon Milo Elliott, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 292 days.

(21) Appl. No.: 10/934,523

(22) Filed: Sep. 3, 2004

(65) Prior Publication Data

US 2006/0069684 A1 Mar. 30, 2006

(51) Int. Cl.
*G06F 17/30* (2006.01)
(52) U.S. Cl. .................. 707/3; 707/1; 707/2; 707/4; 707/6; 707/10; 707/101; 707/102; 707/200; 709/203; 709/217; 709/218; 709/219; 709/246
(58) Field of Classification Search .................. 707/10
See application file for complete search history.

(56) References Cited

U.S. PATENT DOCUMENTS

| | | | |
|---|---|---|---|
| 5,999,938 A | 12/1999 | Bliss et al. | |
| 6,636,873 B1 | 10/2003 | Carini et al. | |
| 2001/0056422 A1 | 12/2001 | Benedict | |
| 2004/0044766 A1 | 3/2004 | Pauly et al. | |
| 2005/0198085 A1* | 9/2005 | Blakey et al. | 707/204 |
| 2005/0222931 A1* | 10/2005 | Mamou et al. | 705/35 |

FOREIGN PATENT DOCUMENTS

| | | |
|---|---|---|
| EP | 1014266 | 6/2000 |
| EP | 1014629 | 6/2000 |
| EP | 1237098 | 9/2002 |
| EP | 1271319 | 1/2003 |
| WO | 0133430 | 5/2001 |
| WO | WO 03/102778 | 12/2003 |

OTHER PUBLICATIONS

Advisory Action dated Jan. 8, 2008, U.S. Appl. No. 10/934,914, filed Sep. 3, 2004.
Office Action dated Sep. 18, 2007, U.S. Appl. No. 10/934,524, filed Sep. 3, 2004.

(Continued)

*Primary Examiner*—Christian P. Chace
*Assistant Examiner*—Farhan M Syed
(74) *Attorney, Agent, or Firm*—Vierra Magen Marcus & DeNiro LLP

(57) ABSTRACT

A Smart Client solution for an enterprise application (e.g., a Customer Relationship Management system) includes a base application (e.g., Microsoft Outlook), and add-in software that interacts with the base application. The add-in software allows the base application to be used to access data and functions of the enterprise application. The add-in software includes an interface manager for accessing items (corresponding to data in the enterprise application) in a data store for the base application, a communications agent in communication (via web services) with the enterprise application, and a synchronization manager in communication with both the interface manager and the communications agent for synchronizing data between the data store for the base application and the enterprise application. In addition to synchronization, Smart Client data can also be converted to and from data for the base application.

27 Claims, 19 Drawing Sheets

OTHER PUBLICATIONS

"Siebel Systems and Microsoft Deliver Integrated Innovation; Siebel 7.7 Releases Utilizes Microsoft .NET," Retrieved from the Internet: URL:http://www.microsoft.com/presspass/press/2004/apr04/04-21msseibelintegrationpr.mspx, Apr. 21, 2004.

Response to Office Action filed Nov. 19, 2007, U.S. Appl. No. 10/934,524, filed Sep. 3, 2004.

Office Action dated Oct. 16, 2007, U.S. Appl. No. 10/934,914, filed Sep. 3, 2004.

Advisory Action dated Dec. 10, 2007, U.S. Appl. No. 10/934,524, filed Sep. 3, 2004.

Response to Office Action filed Dec. 14, 2007, U.S. Appl. No. 10/934,914, filed Sep. 3, 2004.

Non-Final Office Action, United States Patent & Trademark Office, U.S. Appl. No. 10/934,524, filed Sep. 3, 2004, Apr. 18, 2008.

Non-Final Office Action, United States Patent & Trademark Office, U.S. Appl. No. 10/934,914, filed Sep. 3, 2004, May 14, 2008.

Response to Office Action dated Jul. 18, 2008 in U.S. Appl. No. 10/934,524.

Response to Office Action dated Aug. 14, 2008 in U.S. Appl. No. 10/934,914.

Examination Report dated Dec. 12, 2008, European Application No. 05108007.5.

Notice of Allowance dated Dec. 9, 2008, U.S. Appl. No. 10/934,914.

Notice of Allowance and Fee(s) Due dated Feb. 10, 2009 in U.S. Appl. No. 10/934,524.

* cited by examiner

Fig. 2

Alderwoods Account Profile
Group Inc.
Primary Address

| | | Account Detail | |
|---|---|---|---|
| Site: | Burnaby | Parent Organization: | |
| Address1: | 123 Main Street | Subsegment: | Major |
| Address2: | Suite 100 | Parenting Level: | Top |
| Address3: | | Industry: | General, Vertical |
| City: | Houston | Subsidiary: | Canada |
| State/Province: | TX | Sales Region: | |
| Postal Code: | 12345 | Sales District: | Cdn. BC Vancouver |
| Country: | US | Subdistrict: | |
| Main Phone: | 6042999321 | MSTPID: | 1288489 |
| Main Fax: | | Parent Site: | |
| Web Site: | www.alderwoods.com | Vertical: | |
| | | Category: | |
| | | Account Owner: | Personal Services - Other |
| | | Annual Revenue: | |
| | | IT Budget: | 1000000 |

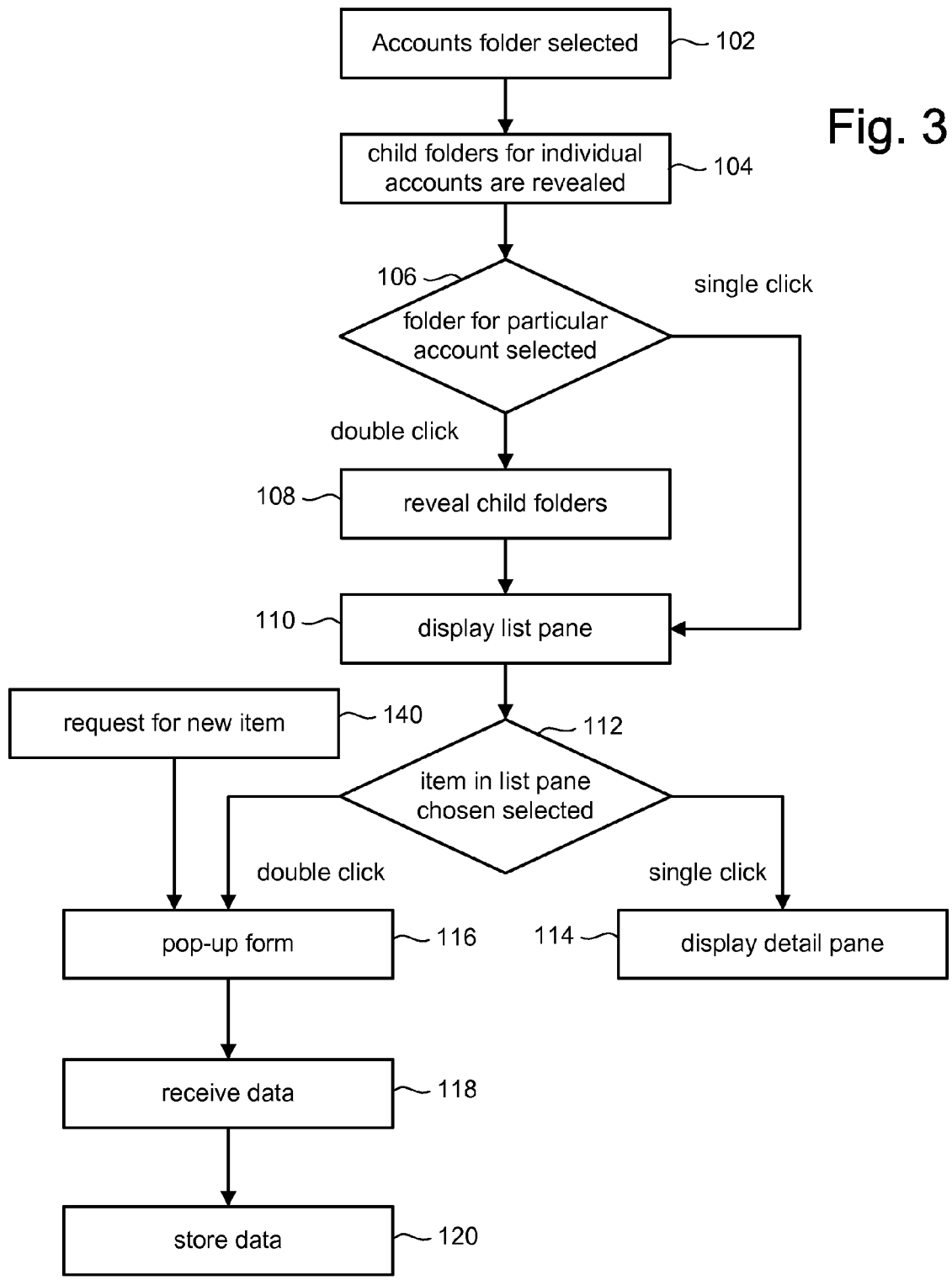

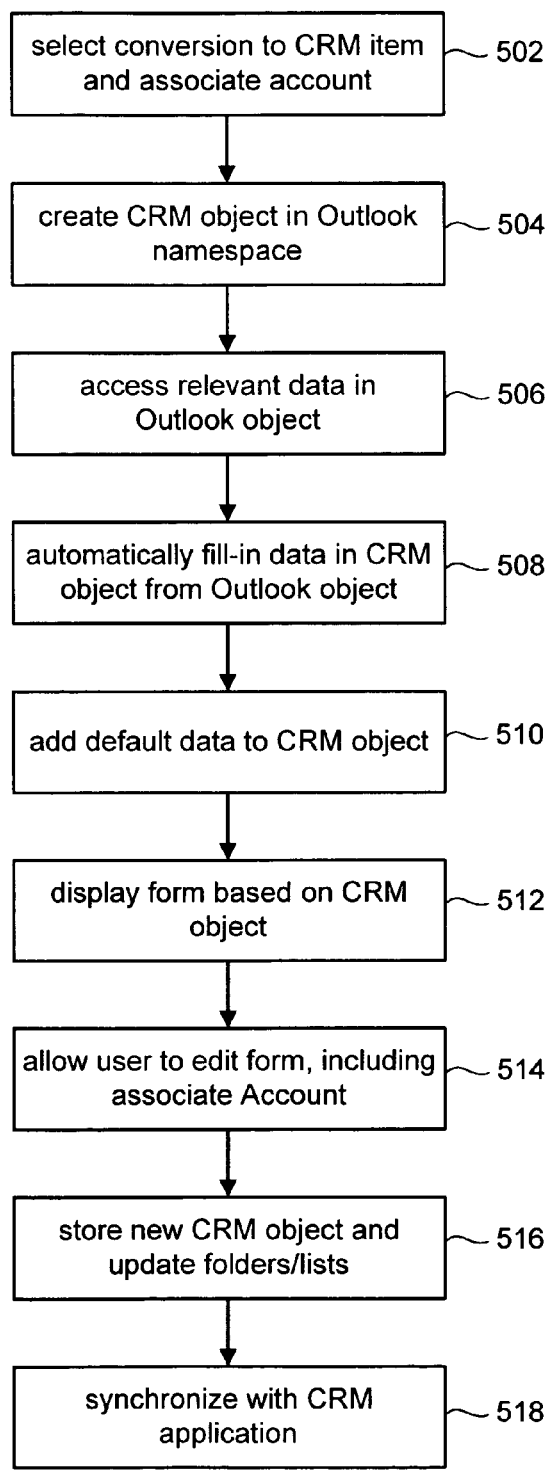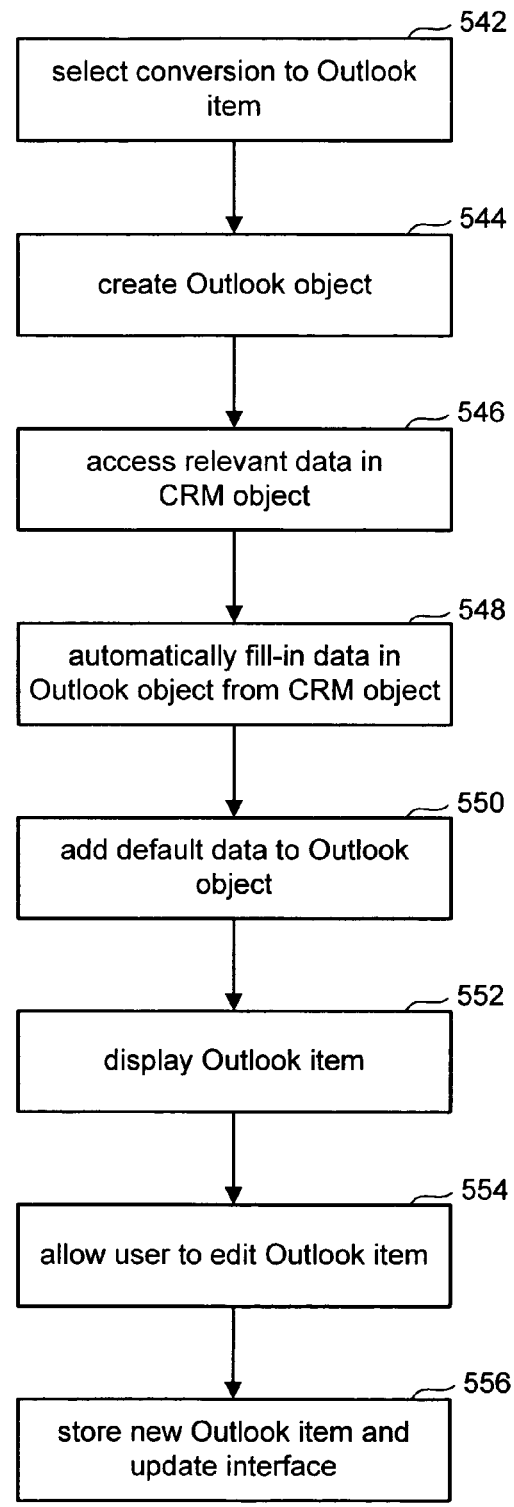

CONVERSION BETWEEN APPLICATION OBJECTS AND SMART CLIENT OBJECTS

CROSS-REFERENCE TO RELATED APPLICATIONS

This Application is related to the following U.S. patent applications: "Smart Client Add-In Architecture," Vadlamani and Silat, filed the same day as the present application Ser. No. 10/934,524 and "Synchronization For Smart Clients," Vadlamani, Elliott and Silat, filed the same day as the present application Ser. No. 10/934,914. The two above listed patent applications are incorporated herein by reference in their entirety.

BACKGROUND OF THE INVENTION

1. Field of the Invention

The present invention relates to using a Smart Client to interface with another application.

2. Description of the Related Art

Customer Relationship Management ("CRM") is an integrated approach to identifying, acquiring and retaining customers. By enabling organizations to manage and coordinate customer interactions across multiple channels, departments, lines of business, and geographies, CRM helps organizations maximize the value of customer interactions and drive superior corporate performance.

Today's organizations must manage customer interactions across multiple communications channels—including the Web, call centers, field sales, dealers and partner networks. Many organizations also have multiple lines of business with many overlapping customers. The challenge is to make it easy for customers to do business with the organization any way they want—at any time, through any channel, in any language or currency—and to make customers feel that they are dealing with a single, unified organization that recognizes them at every touch point.

By streamlining processes and providing sales, marketing and service personnel with better, more complete customer information, CRM enables organizations to establish more profitable customer relationships and decreased operating costs. Sales organizations can shorten the sales cycle and increase key sales-performance metrics, such as revenue per sales representative, average order size and revenue per customer. Marketing organizations can increase campaign response rates and market-driven revenue while simultaneously decreasing lead generation and customer acquisition costs. Customer service organizations can increase service-agent productivity and customer retention while decreasing service costs, response times and request resolution times. Companies that create satisfied, loyal customers are more likely to have repeat business, lower customer acquisition costs and build stronger brand value, all of which translates into better performance.

To implement CRM approaches, organizations have made use of CRM software. For example, an organization might build a database (or other data structure) about its customers that describe relationships in sufficient detail so that management, sales people, service people and partners can directly access information, match customer needs with product plans and offerings, remind customers of service requirements, know what other products a customer had purchased, understand service histories for various customers and coordinate sales and marketing efforts. Thus, a CRM software system may include (but is not limited to) a data structure that stores contact information for customers, sales history, service history, sales leads information, various activities being performed on behalf of a customer, sales opportunities, and/or other data.

Although CRM software systems can provide substantial return on investment for an organization, not all organizations who have implemented a CRM system have been properly taking advantage of the CRM system. For example, many employees are not normally logged into a CRM system. When a particular sales lead is generated or other activity is planned or performed, it is not always convenience to go seek access to the CRM system to record the data. In some cases, the employees of an organization are not properly trained to use the CRM software system. Some employees may not know how to access the CRM system at all. Many CRM systems are custom solutions, which require a large amount of training of individuals. Thus, many CRM systems are not sufficiently utilized to maximize the return on investment.

In addition, CRM data and processes may reside in multiple datastores or systems which are not combined. This creates a barrier for a CRM user to combine all of this transactional, engagement and profile information to fully understand a customers complete relationship.

SUMMARY OF THE INVENTION

A proposed solution to the above-described issues with CRM systems is to use a well known and regularly used software application as a Smart Client to the CRM system. Since the application is well known, organizations will incur less of a burden training employees. If the application is an often used application, such as a normally running desktop application that performs scheduling and messaging, then it will be more convenient for employees to access the CRM system (e.g., via the Smart Client) and, therefore, employees will make greater use of the system by using the Smart Client.

In one example, Outlook® from Microsoft Corporation, with add-in software, can be used as a Smart Client for a CRM system. The technology described herein, however, can also be used more generically. That is, the technology described herein can also be used as a Smart Client solution for various types of enterprise applications in addition to CRM systems. Similarly, the technology described herein also applies to Smart Clients which are based on applications other than Outlook®.

In one embodiment, a Smart Client solution for an enterprise application (e.g., a CRM system) includes a base application (e.g., Microsoft Outlook) and add-in software that interfaces with the base application. The add-in software allows the base application to be used to access the data and functions of the enterprise application. The add-in software includes an interface manager for accessing items (corresponding to data in the enterprise application) in a data store for the base application, a communications agent in communication (via web services) with the enterprise application, and a synchronization manager in communication with both the interface manager and the communications agent for synchronizing data between the data store for the base application and the enterprise application. In addition to synchronization, Smart Client data can also be converted to and from data for the base application.

BRIEF DESCRIPTION OF THE DRAWINGS

FIG. 2 depicts a portion of a graphical User Interface for a Smart Client.

FIG. 3 is a flowchart describing one embodiment of a process for viewing, editing and/or creating accounts using a Smart Client.

FIG. 10 is a flowchart describing one embodiment of a process for converting data items.

FIG. 11 is a flowchart describing one embodiment of a process for converting data items.

DETAILED DESCRIPTION

I. User Interface

Figure 1:
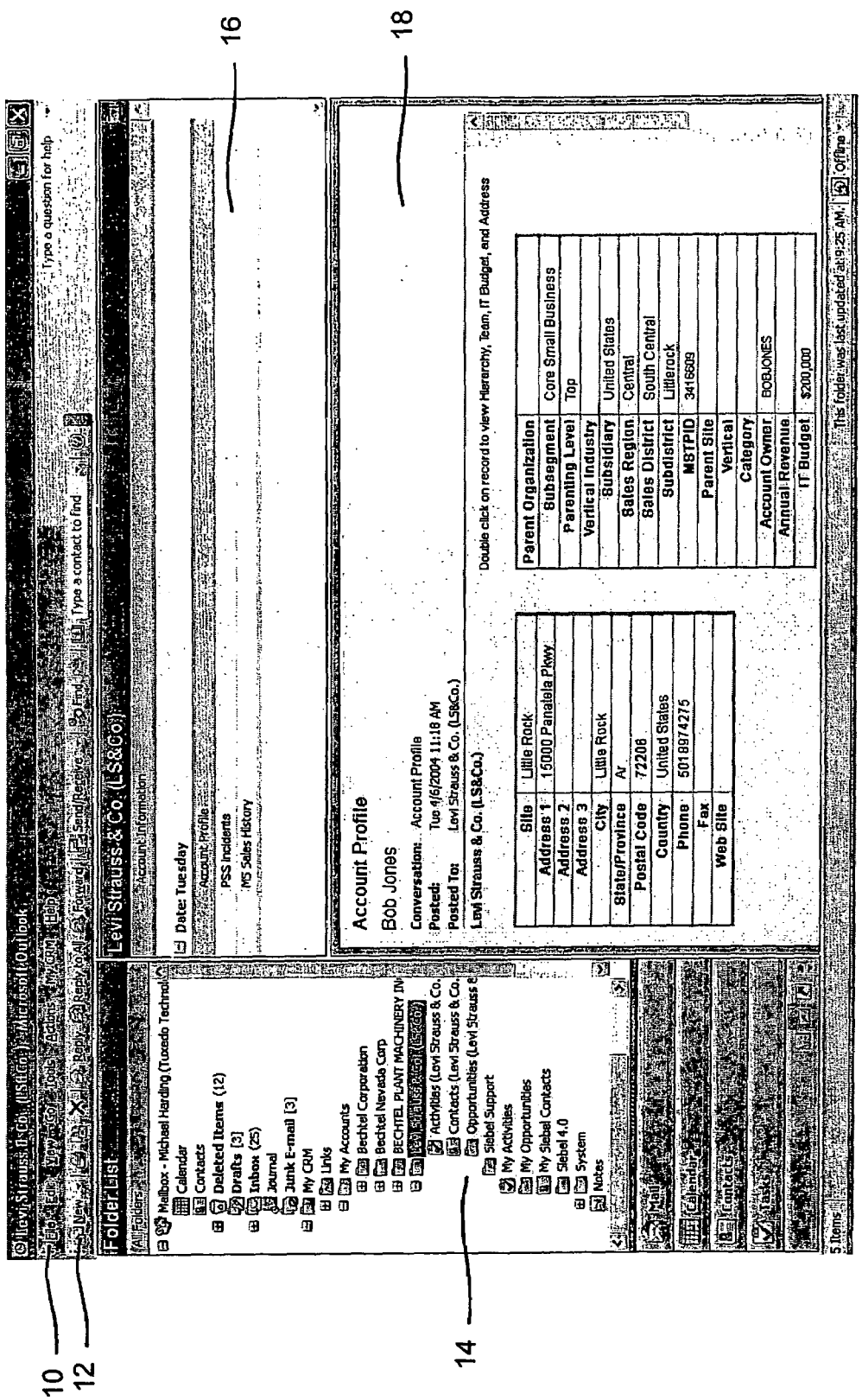
FIG. 1 depicts one example of a graphical User Interface for a Smart Client.

To enable greater acceptance and use of a CRM system, it is proposed to use a Smart Client for interacting with the CRM system. One example of a Smart Client can be created from the combination of an existing application that a user is already comfortable and familiar with and an Add-In (or AddIn) to that application. One example of an application that a user is comfortable and familiar with is a collaboration, messaging and/or scheduling application. One example of a collaboration, messaging and/or scheduling application is Outlook® from Microsoft Corporation. However, various aspects described herein can be implemented using other collaboration messaging and/or scheduling applications, as well as other applications.

Outlook® can be combined with a Smart Client AddIn to create a Smart Client that can access data in a CRM system. A Smart Client AddIn includes software that can interface with a base application, such as Outlook®, through various means. For example, an AddIn may make use of a library, application program interface, software development kit or other interface.

In one embodiment, a Smart Client is an application (or set of applications) that helps manipulate rich application data within a user's workflow, is on a local machine, has a rich User Interface experience of a thick client, and has the flexibility of a thin client associated with web-based computing. In some embodiments, Smart Clients can "consume" or interact with web services that are based on the Extensible Markup Language (XML), a widely accepted computer industry standard that enables the exchange of data between disparate computer systems, programming languages, and software applications. Smart Clients can take advantage of the local processing power of the client device, providing an extra measure of performance that is often missing in pure Web-based computing (for example, thin clients such as a Web browser), which is highly dependent on the capabilities of a particular network's bandwidth. Many Smart Clients (including the Smart Client described herein) can be used online or offline, ensuring that productivity is not compromised even when not connected. A Smart Client also provides broad accessibility and availability via the internet, local client or any mobile device The technology described herein can be used with many different Smart Clients and many different target applications. For example purposes, the discussion below will make use of an implementation of a Smart Client that comprises Outlook® in conjunction with AddIn software. The target application in the example is a CRM system from Siebel Systems, Inc. The Smart Client AddIn will allow users to access CRM data in the Siebel CRM system using Outlook®. Most of the functionality offered by the Smart Client AddIn will be wrapped around Siebel data and functions. Not every function of the CRM system will be implemented by the Smart Client AddIn. Rather, the Smart Client seeks to make available those most common functions performed by professionals on a day-to-day basis, whereas deeper CRM functions can be available through a thin online client. The CRM data will also be available within Outlook® in an offline mode.

FIG. 1 provides an example of a graphical User Interface (GUI) provided by the Smart Client AddIn within Outlook®. The GUI includes a top level menu 10, toolbar 12, navigation pane 14, list pane 16 and detail pane 18. The top level menu 10 includes headings such as File, Edit, View, Go, Tools, Actions, MyCRM, and Help. The menu items File, Edit, View, Go, Tools, Actions, and Help are Outlook menu items. The menu MyCRM is a new menu added to Outlook® by the Smart Client AddIn. In other embodiments, other labels different than "MyCRM" will be used for the top level menu (e.g., "Customer Explorer"). Clicking on the menu item MyCRM reveals the following options: CreateNewOpportunity, CreateNewActivity, CreateNewContact, SyncManager, About and Help.

Toolbar 12 provides shortcuts to various functions within the Smart Client. Navigation pane 14 depicts the various folders of data items available through the Smart Client. Some of the folders, including Calendar, Contacts, Deleted Items, Drafts, Inbox, Journal, Junk, E-mail and Notes, are part of the core Outlook® functionality. Other folders, such as MyCRM, are part of the Smart Client functionality provided by the Smart Client AddIn. When a user single-clicks on a folder, list pane 16 will be populated with a list of items associated with that folder. More detail will be provided below. If the user single-clicks an item listed in the list pane 16, more detail about that particular data item is provided in detail pane 18. If a user double-clicks on an item in list pane 16, a new window pops up that includes detailed information about the item. FIG. 2 provides an example of a new window that popped up in response to double-clicking on an item in list pane 16. The information in the window that pops up is similar to the information that is depicted in the detail pane 18. However, the pop-up window of FIG. 2 allows the user to edit information.

The Smart Client AddIn has its own hierarchy of folders representing the CRM data in the folder structure of navigation pane 14. When a user double clicks on the folder at the top of the hierarchy of the CRM data (the folder labeled MyCRM) or the user clicks on the "+" sign next to that folder, the child folders of that folder will be displayed. In one embodiment, the child folders include Links, MyAccounts, MyActivities, MyOpportunities, MyContacts, Siebel and System. The folder MyAccounts includes one subfolder for each account for which CRM data is available to this particular user. Each of the account folders (e.g., Bechtel Corporation, Bechtel Nevada Corp., Bechtel Plant Machinery, Levi Strauss & Co.), have subfolders for Activities, Contacts and Opportunities.

The CRM application includes many different types of data items. Three of the available data items in the CRM application include activities, contacts and opportunities. An activity is a data record that stores information about some ongoing activity being performed in relation to a customer. This could be a sales activity, marketing activity, service activity, etc. A contact item includes contact data such as name, address, etc. An opportunity item includes data about various opportunities with respect to a customer. This can include marketing opportunities, sales opportunities, etc. No specific format for these data items is required for the technology described herein. Various opportunity data items, activity data items and contact data items exist in the CRM application. Additionally, other types of data items also exist in the CRM application. As discussed above, in one embodiment, the Smart Client is not designed to access every type of data item. Thus, in one embodiment, these three data items were chosen to be accessed.

The Activity folder under each account stores the activity data items associated with that account. The Contacts folder for each account stores all the contact data items associated with that account. The Opportunities folder for each account stores all the opportunity data items associated with that account. The folder MyActivities stores all of the activity data items associated with the user. The folder MyOpportunities stores all the opportunity data items associated with the user. The MyContacts folder (or My Seibel Contacts) stores all the contact data items associated with the particular user. In many cases, a particular data item can show up in both the folder below an account and in the My [Activities/Contacts/Opportunities] folder.

Selecting the MyOpportunities folder by a single mouse click causes a listing of the opportunity records in the list pane for which the user is a part of the activity team. A double-click on any opportunity item pops up a custom opportunity form. This form contains tabs, which allows the user to toggle between opportunity detail information.

Selecting the MyActivities folder reveals a list of activities in the list pane. These activities are either owned by the user or the user is part of the employee group for these activities. Users will be able to launch customer activity edit forms by double clicking on any of the activities in the list pane.

The MySiebelContacts folder contains contacts with the same visibility rules as in the CRM system. These contacts are associated with accounts whose teams the user is on or the user is part of the contact team. Double-clicking on a contact item causes a pop-up window with more detail.

Clicking on the Siebel 4.0 folder in FIG. 1 opens an instance of the Siebel CRM system within the context of Outlook® and navigates to the opportunity management view. Double-clicking on the Links folder (or a single click on the "+" symbol next to the Links folder) reveals predefined customizable links. Clicking on any of these links opens a browser instance within the context of Outlook® and navigates to the relevant website defined by the link.

The System folder is provided for system management functions. This folder contains a subfolder titled SyncErrors. The SyncErrors subfolder contains the following child subfolders: OpportunitySyncErrors, ActivitySyncErrors, and ContactSyncErrors. These folders will contain records that have been involved in conflicts during the synchronization process. Users will be able read the records within each of these folders. These records are read-only. However, the user is permitted to delete these records within the SyncError folders.

The list pane in Outlook® can be customized for the CRM folders. Outlook® provides a way to associate an XML-based view definition for the list pane. This definition allows for the specification of the columns to be displayed and the formatting of rows in the list. The following is a sample XML definition:

```xml
<?xml version="1.0"?>
<view type="table">
    <viewname>AccountListView</viewname>
    <viewstyle>table-layout:fixed;width:100%;font-family:Tahoma;
        font-style:normal;font-weight:normal;
        font-size:8pt;color:Black;font-
      charset:0
    </viewstyle>
    <viewtime>0</viewtime>
    <linecolor>8421504</linecolor>
    <linestyle>3</linestyle>
    <usequickflags>0</usequickflags>
    <rowstyle>background-color:#FFFFFF</rowstyle>
    <headerstyle>background-
color:#D3D3D3</headerstyle>
    <previewstyle>color:Blue</previewstyle>
    <arrangement>
        <autogroup>1</autogroup>
        <collapsethreads>1</collapsethreads>
        <collapseclient></collapseclient>
    </arrangement>
    <column>
        <heading>Subject</heading>
        <prop>urn:schemas:httpmail:subject</prop>
        <type>string</type>
        <width>344</width>
        <style>padding-left:3px;;text-
align:left</style>
    </column>
    <multiline>
        <width>0</width>
    </multiline>
    <groupbydefault>2</groupbydefault>
    <previewpane>
        <visible>1</visible>
        <markasread>0</markasread>
    </previewpane>
</view>
```

II. Workflow

FIG. 3 is a flowchart describing one embodiment for viewing, editing and creating accounts using the Smart Client. In step 102, user will double-click the "MyAccounts" folder from navigation pane 14. This will cause the child folders for all the individual accounts to be revealed in step 104. For example, the GUI of FIG. 1 shows individual folders for four separate accounts (Bechtel Corporation, Bechtel Nevada Corp., Bechtel Plant Machinery, and Levi Strauss & Co.). In another embodiment, the user can single click on the "+" next to the folder. In step 106, one of the subfolders is selected. That is, user chooses a particular account. If the user double-clicked on that folder (or single-clicked on the "+" next to the folder), the child folders for that account folder are revealed in step 108. In one embodiment, a set of child folders can include folders for activities, contacts and opportunities for that account. For example, FIG. 1 shows the child folders for Levi Strauss & Co. In other embodiments, other child folders can also be used. In step 110, list pane 16 is displayed for the particular account. For example, FIG. 1 shows a list pane with three items: account profile, PSS incidents and MS sales history. Note that if, in step 106, a folder is selected by single clicking on the folder, then the system will display the list pane (step 110) without necessarily revealing the child folders. The account profile item displayed in the list pane stores account information. The PSS incidents item in the list pane stores information relevant to service incidents for customers associated with the account. The sales history item provides information about the sales history for that particular account. In other embodiments, there can be additional different items in the list pane.

In step 112, one of the items in the list pane is chosen. If the item is chosen with a single click (step 114), then the information associated with the item in the list pane is disclosed in detail pane 18. (See FIG. 1 for one example.) Typically, the information displayed in detail pane 18 is read-only. Although it may be possible to edit that information, the information is not editable in detail pane 18. If the user wants to edit it, the user would double-click the item in the list pane (step 112), which would cause the system to provide a pop-up form 116. FIG. 2 is one example of the pop-up form. Some or all the information can be edited in the pop-up form. In step 118, the system can receive data from the user, editing some or all of the information in the pop-up form. That information is stored in step 120. Typically, a user may store the information by clicking on a save button. Note that the window in FIG. 12 includes a close button and a "View in Siebel" button. If the user clicks on the "close" button, the window of FIG. 2 will be closed without saving the information. If the user clicks on the "View in Siebel" button, then a pop-up browser window will be displayed and a connection will be made (within that browser window) to the Siebel CRM system in order to display the information directly from the Siebel CRM system.

At any time while interacting with the GUI of FIG. 1, a user can choose the "MyCRM" menu. From that menu, one of the choices is "create an account." If the user chooses the "create an account" option (step 140), then the user will be provided the pop-up form of step 116. Data can be inserted into that pop-up form (step 118) and saved (step 120). As can be seen, the pop-up form displayed in FIG. 2, which is displayed in response to a user double-clicking on an "account profile" in the list pane, includes the following fields: site, address 1, address 2, address 3, city, state, ZIP code, country, main phone number, main fax number, website, parent organization, market sub-segment, parenting level, industry, subsidiary, sales region, sales district, sub district, ID, parent site, vertical position, category, account owner, annual revenue and IT budget. The form of FIG. 2 has multiple tabs. The above-described fields are all in the account profile tab. This tab can provide a summary of all the other tabs. The "address" tab stores an indication whether the particular address is a primary address, as well as the following fields: site, address 1, address 2, address 3, city, state, ZIP code, and country. The "team" tab lists all the people on the particular team for that account. For each person, the tab lists the first name, last name and alias.

When the user clicks on the "hierarchy" tab, they will see a hierarchical depiction of the selected account, along with the other accounts that are related to that account. Those accounts that belong to the user may be accessed by double clicking on that account name. When a user performs a single mouse click on an accessible account in the hierarchy window, the active focus in the "MyAccounts" folder in the navigation pane should shift to that account and the pop-up screen will refresh to display the data for the account (which the user selected with a single click), defaulting to the information tab. By clicking on the "IT budget" tab, the system will reveal the IT budget information by fiscal year, including the amount in the budget, how much is to be spent in association with the owner of the CRM system, and the currency.

Selecting one of the items in the list pane other than account profile will cause the system to access an external system for obtaining data relevant to the particular item in the list pane. This external system is likely to be on a remote machine. Thus, there could be a separate system for storing information about service incidents. By selecting "PSS incidents" in the list pane, the system will access this external system and provide the data in a pop-up menu or in detail pane 18. In some embodiments, the information is always provided as read-only. In other embodiments, the pop-up form could be read and write accessible. Similarly, an external system could store sales history information, which is accessed by selecting the sales history item in the list pane 16.

Figure 4:
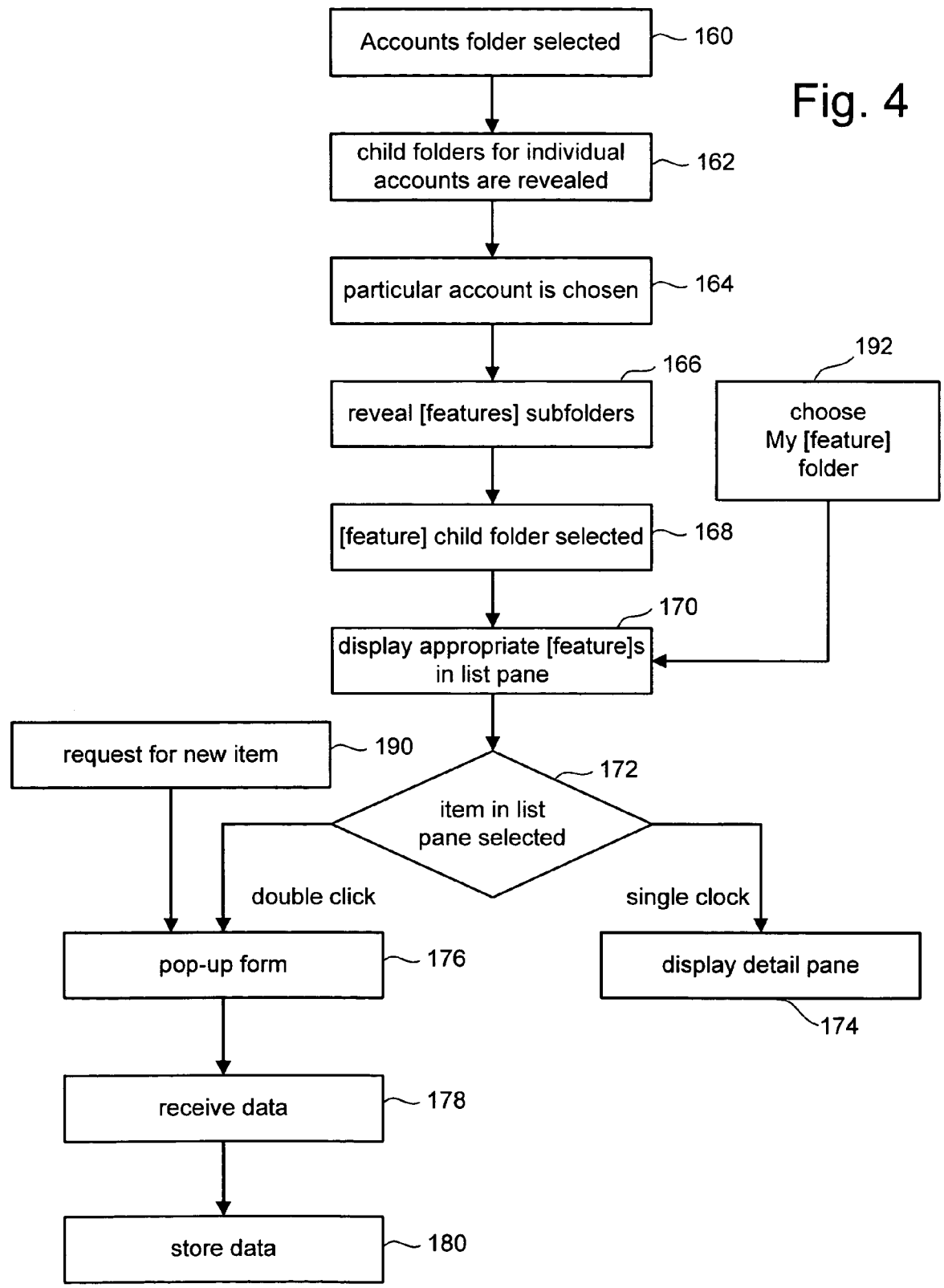
FIG. 4 is a flowchart describing one embodiment of a process viewing, editing and/or creating various data items using a Smart Client.

FIG. 4 is a flowchart describing one embodiment of a process for viewing, editing and creating opportunities, contacts, activities and/or other items. In step 160, the MyAccounts folder is selected, causing the child folders for the individual accounts to be revealed in step 162. In step 164, one of the particular accounts is chosen by double clicking on that particular folder or single clicking on the "+" next to the folder. In step 166, the subfolders for each of the features of the account are revealed, including subfolders for opportunities, activities and contacts. In other embodiments, there can be subfolders for other features of the CRM system. In step 168, one of the subfolders for a feature is selected. In response to selecting the subfolder, the appropriate information is displayed in list pane 16 (step 170). For example, if the Opportunity subfolder is selected, the list pane will display a list of opportunity items. If Contacts subfolder is selected, the list pane will display a list of contact items. If Activities subfolder is selected, the list pane will display a list of activities.

Steps 160 through 170 were described above with reference to the process of selecting an account and then a subfolder for that account. Alternatively, the user can select the MyActivities folder, MyOpportunities folder, MyContacts folder in step 192. In response to that selection, the system will display in the list pane all the appropriate activities, contacts, or opportunities associated with the alias of the user currently using the system. In step 172, one of the items in the list pane is selected. If the selection is performed by single clicking on the item in the list pane, then detail pane 18 will display the details of that particular item in step 174. If the item is selected in step 172 by double clicking on the item, then a pop-up form will be displayed in step 176. The user will have the opportunity to edit some or all the data in step 178. In step 180, the data received in step 178 will then be stored.

Additionally, while operating the GUI of FIG. 1, the user can choose the "MyCRM" menu and request that a new item (activity, contact, opportunity, etc.) be created. In response to that selection in step 190, the system will provide the pop-up form in step 176. The user will then be allowed to provide data, which will be received in step 178 and stored in step 180. When a new item is created, the system will assign a local identification (LocalID) to the new item. This LocalID will be used by the system to identify the item until the item is synchronized with the CRM system and the CRM system provides a CRM identification (ServerID). After receiving a ServerID, the item will be identified by the ServerID.

In one embodiment, the pop-up form for Opportunities will include a "Save" button, a "Close" button, a "View in Seibel" button, and various tabs. In one implementation, the tabs include the following: Opportunity Information, Team, Activities, Contacts, Notes, Products, Services, and Partners. The "Opportunity Information" tab includes the following fields: opportunity name, company name, created date, sales stage, due date, opportunity type, opportunity owner, status, currency code, licensing program, licensing subtype, a flag indicating whether there is forecasts for this client, a flag indicating whether this is a critical deal, closing date and a description. The "Team" tab will include the people on the team for the account associated with the opportunity. The "Activities" tab will have a list of all the activities associated with that opportunity. The "Contacts" tab will have a list of all the contacts associated with that opportunity. "Notes" can include notes written by any of the users associated with the opportunity. "Services" indicate the services associated with the opportunity. And "Partners" indicate any business partners associated with the owner of the CRM that are involved with that particular opportunity.

When double clicking on an "Activity" in the list pane (step 172 of FIG. 4), the pop-up form displayed will include the following fields (in addition to a "Save" button, "Close" button and "View in Siebel" button): description, owner, type, category, purpose, company name, contact name, opportunity, due date, status and comments. In some embodiments, Activities can be associated with Contacts or Opportunities. In that case, there will be fields in the Activities form that indicates the ServerID(s) for the associated Contacts or Opportunities.

When double-clicking on a "Contact" item in the list pane (step 172), the pop-up form displayed in step 176 will include five tabs: General, Details, Activities, Certificates, All Fields. The General tab will include the following fields: first name, last name, job title, company, file as, phone numbers, address, e-mail address, display as, web page address, instant messaging address, and description. The "Details" tab will include fields for department, office, profession, manager's name, assistant's name, nickname, title, suffix, spouse's name, birthday, anniversary, directory server, e-mail alias and address. The "Activities" tab will include a list of all activities associated with that contact. The "Certificate" tab will include a list of all certificates associated with that contact. The "All Fields" tab includes a list of user-defined fields. In one embodiment, this can include user-defined fields associated with data in the CRM system, including: department, a URL for accessing data about this particular person in the CRM system, and various flags indicating various attributes. An example of some of those flags include indications of whether the person is a key contact, the person filled out a satisfaction survey, e-mails are allowed to be sent to that person, regular mail is allowed to be sent to that person, phone calls are allowed, faxes are allowed, and other appropriate data.

FIG. 1 also shows a folder titled "Links." This folder includes a set of subfolders. Each of the subfolders is associated with a separate link. A single mouse click on any of these subfolders (which have embedded URLs) will open a separate browser window and navigate to the site specified in the embedded URL. In one embodiment, these links can be established during an initial setup procedure. Once these links are established, a user can make changes to the embedded URLs. User can also make the additions to the list of URLs. Additional links created by a user will not be updated during synchronization. In one embodiment, Only the preconfigured links will be refreshed during the synchronization process.

Figure 5:
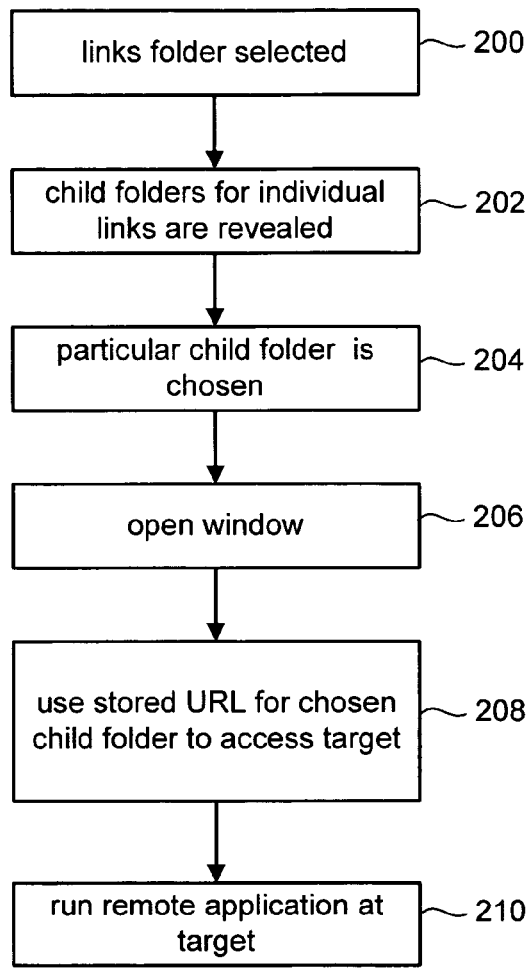
FIG. 5 is a flowchart describing one embodiment of a process for accessing applications from a Smart Client.

FIG. 5 is a flowchart describing a process for using the links. In step 200, the user selects the "Links" folder by double-clicking on the folder or clicking on the "+" next to the folder. In step 202, the child folders are revealed in response to the "Link" folder being selected in step 200. In step 204, one of the child folders is selected by single-clicking on that folder. In step 206, a browser window is opened. In step 208, the URL stored in association with the chosen folder is used to access the target of the URL. In step 210, an application at the target site is run or otherwise interacted with. For example, target sites can include various information about the users, activities, opportunities, contacts, accounts, the CRM system (e.g., Help), and other data in regard to customer relations management.

Figure 6:
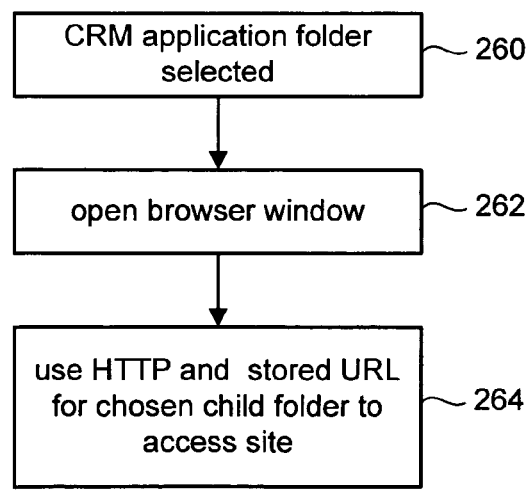
FIG. 6 is a flowchart describing one embodiment for accessing a CRM application from a Smart Client.

FIG. 6 is a flowchart describing one embodiment of a process for using a link within the Smart Client to directly access the CRM system. For example, FIG. 1 shows a folder titled "Siebel 4.0." In other implementations, other titles for this folder can be used. In step 260 of FIG. 6, that particular CRM application folder (e.g., "Siebel 4.0") is selected. In step 262, a browser window is opened. In step 264, the URL associated with that particular folder is used to access the CRM system directly. The user is typically provided a login page to log in and the user can access any of the available functions of the CRM system. In some embodiments, login information can be stored in the Smart Client, thereby, allowing the user to bypass the login page and be automatically logged into the CRM system.

III. Components

Figure 7:
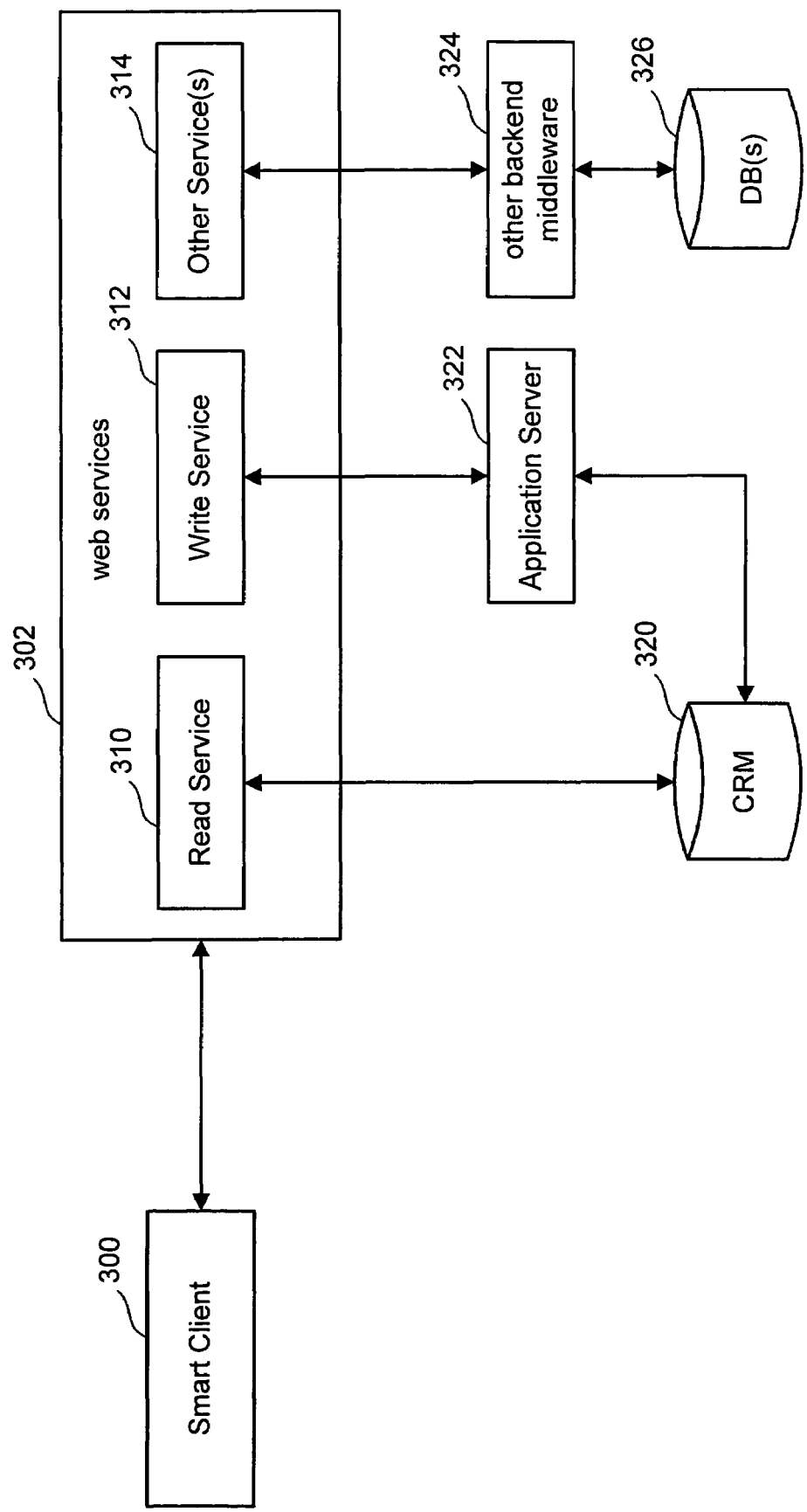
FIG. 7 is a block diagram depicting one embodiment of an architecture for using a Smart Client with an external application such as a CRM software system.

FIG. 7 is a block diagram depicting one embodiment of an architecture for implementing the system described herein. FIG. 7 shows a Smart Client 300, which implements the GUI of FIGS. 1 and 2 and the processes described by FIGS. 3-6. Smart Client 300 can be used to create, edit and delete activity objects, opportunity objects and contact objects for the CRM system. These objects are stored at the Smart Client and synchronized to the CRM system. More information about Smart Client 300 will be provided below. Smart Client 300 is in communication with web services 302.

Web services are discrete units of code, each handling a different set of tasks. Typically (but not always), web services are based on XML and can be called across platforms and operating systems, regardless of programming languages used. Web services let applications share data, and invoke capabilities from other applications without regard to how those applications were built, what operating systems or platform they run on, and what devices are used to access them. Although web services can remain independent of each other, they can loosely link themselves into a collaborating group that performs a particular task. Web services also make it possible for developers to choose between building all pieces of their applications, or consuming (using) web services created by others. This means that an individual company does not have to supply every piece for a complete solution. The ability to expose (announce and offer) a web service, creates new revenue streams for a particular entity. In some embodiments, web services are invoked over the Internet by means of industry-standard protocols including SOAP; XML; and Universal Description, Discovery, and Integration (UDDI). They can be typically defined through public standard organizations such as the World Wide Web Consortium (W3C). SOAP is an XML-based messaging technology standardized by the W3C, which specifies necessary rules for locating web services, integrating them into applications, and communicating between them. UDDI is a public registry, offered at no cost, where one can publish and inquire about web services.

In one embodiment, web services 302 is an Alchemy Common Platform (ACP) to build and manage scalable web services. Within the context of Smart Client 300, ACP provides various CRM web services that expose CRM data operations from the backend CRM system. In one embodiment, when the CRM system is a Siebel system, Siebel data and operations are exposed through two sets of services. One set for retrieving Siebel objects and the other set for creating and modifying Siebel objects. These are the read service 310 and write service 312. The Siebel web services are architected as two separate services due to performance reasons. Read web services 310 communicates directly (via the Internet) with the Siebel OLTP database 320 (or other data store) to ensure best performance for retrieving data. Write service 312 communicates with Siebel application server 322 in order to take advantage of all the business rules that are invoked during creation and modification of Siebel objects. Siebel application server 322 communicates with data store 320. In addition, depending on the embodiment, other services 314 can be used to communicate with other backend middleware 324 to read from or write to various databases (or other types of data stores) 326. For example, there are various links described above that can be used to access other third-party systems.

In one embodiment, Smart Client 300 communicates with web services 302 via the Internet or other type of network. Web services 302 communicates with data store 320, application server 322 and middleware 324 via the Internet or other networking solution. The communication can be via land lines, wireless or other suitable technologies. Additionally, communication can be implemented using TCP/IP or other protocols as suitable for the particular application.

In one embodiment, the CRM system, including data store 320 and application server 322, are pre-existing software systems. The technology described herein is for implementing Smart Client 300 to interact with pre-existing web services 302 and the pre-existing CRM system. The Smart Client 300 further includes the ability to bring together data from the CRM system and other systems, via other services 314 in communication with other backend middleware 324 and database 326. The CRM system is just one example of a line of business application that can be used with the smart client. The Smart Client described herein can be used with applications other than a CRM system.

In one embodiment, Smart Client 300 is operating on a local machine, while the CRM system (including application server 32 and data store 320) is on one or more different machines remote from the local machine. Web services 302 can be operating on one or more different machines than the Smart Client and the CRM system. In other embodiments, some or all of web services 302 can be operating on the same machine as the Smart Client or the CRM system. Some embodiments will not use web services; rather, Agent 372 will directly contact the CRM system (or other application).

Figure 8:
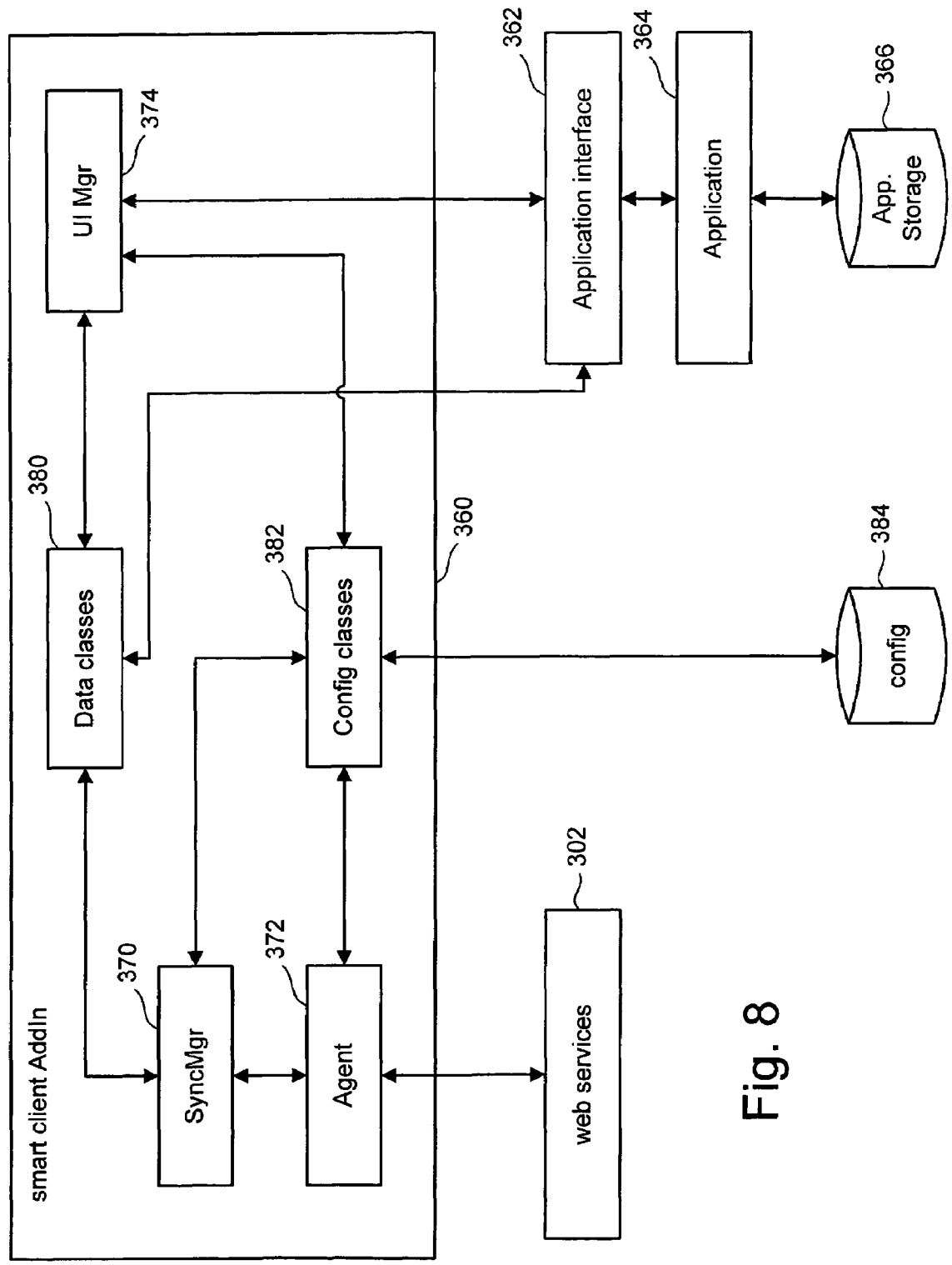
FIG. 8 is a block diagram describing one embodiment of an architecture for a Smart Client.

FIG. 8 is a block diagram describing one embodiment of an architecture for Smart Client 300. FIG. 8 depicts Smart Client AddIn 360 in communication with application interface 362, web services 302 and configuration data store 384. Application interface 362 is in communication with application 364 (the base application), which includes application storage 366. The Smart Client can be implemented with many different types of base applications. In one embodiment, the Smart Client of FIG. 8 is implemented with a collaboration, messaging and scheduling application. One example of such a collaboration, messaging and scheduling application is Outlook®, from Microsoft Corporation. In that example, storage 366 is the Outlook® object store. The Smart Client can also be implemented with other collaboration, messaging and scheduling systems; or other types of systems. Additionally, applications performing collaboration-only, messaging-only, scheduling-only or some other combination of the three, can also be used with the Smart Client. The Smart Client PlugIn acts as the last mile of software to enable the user to make more efficient use of the CRM system. The Smart Client AddIn allows Outlook® to be used as a portal to the CRM system.

Application interface 362 provides an interface to application 364. For example, application interface can be a software development kit, a library, an application program interface (API) or other interface. Application interface 362 should provide access to the objects used by application 364 and to the events that occur within application 364. Thus, in response to an event within application 364, an entity using application interface 362 should be notified of the event and be able to get or set objects such as data objects and user interface objects.

In one embodiment, application interface 362 is a software development kit that is a .NET wrapper on top of the Outlook® object model. Application interface 362 exposes objects and events to AddIn 360. The Smart Client AddIn 360 uses application interface 362 to communicate/interface with Outlook®. Application interface 362 provides the ability to create and associate forms with data. Entities using application interface 362 can set and retrieve standard and custom properties within Outlook, create/delete/edit objects, be notified (or trap) events within Outlook, create/change/manage the user interface (e.g., size, color, font, headings, buttons, fields, etc.), create and change menus, create and change the toolbar, create and manage folders, and perform other activities within Outlook. Additionally, to provide for thread safety, events are invoked from the main UI thread and collection classes expose a syncroot.

Smart Client AddIn 360 includes three major components: Sync Manager 370, Service Agent 372 and User Interface (UI) manager 374. Service Agent 372 works with web services 302 to communicate with enterprise applications (e.g., CRM system) on the server side to set and get data. UI manager 374, which communicates with application interface 362, utilizes the standards of the Windows programming model to customize necessary User Interface objects. UI manager 372 also acts as a conduit to trap all the necessary events that are exposed via the application interface 362 to work with Outlook® objects as appropriate in the context of the AddIn business logic.

Sync Manager 370 provides the logic of how to synchronize the CRM data stored by Outlook with data at the CRM system. Sync Manager 370 can be configured for priority (e.g., background/foreground) and timing. Sync Manager 370 is in communication with Service Agent 372, data classes 380 and configuration classes 382. Both Service Agent 372 and UI manager 374 are also in communication with configuration classes 382. Sync Manager 370 uses Service Agent 372 to access activity, opportunity and contact records at the CRM system (data store 320). Sync Manager 370 uses Interface Manager 374 (via data classes 380) to access activity, opportunity and contact objects that are stored in data store 366 and which correspond to data at the CRM system (e.g., activity, opportunity and contact records).

Configuration classes 382 are a set of object-oriented software classes that are used to communicate with configuration data store 384 to manage configuration data for Smart Client AddIn 360. Synchronization manager 370, Service Agent 372 and UI manager 374 will read the configuration data 384 via configuration classes 382 in order to perform the various functions described herein.

Data classes 380 are in communication with UI manager 374, Sync Manager 370 and application interface 362. In one embodiment, data classes 380 are used to work with the various data items discussed herein.

In one embodiment, Sync Manager 370, Service Agent 372, UI manager 374, data classes 380 and configuration classes 382 are all software components operating on one or more computing devices.

Figure 8A:
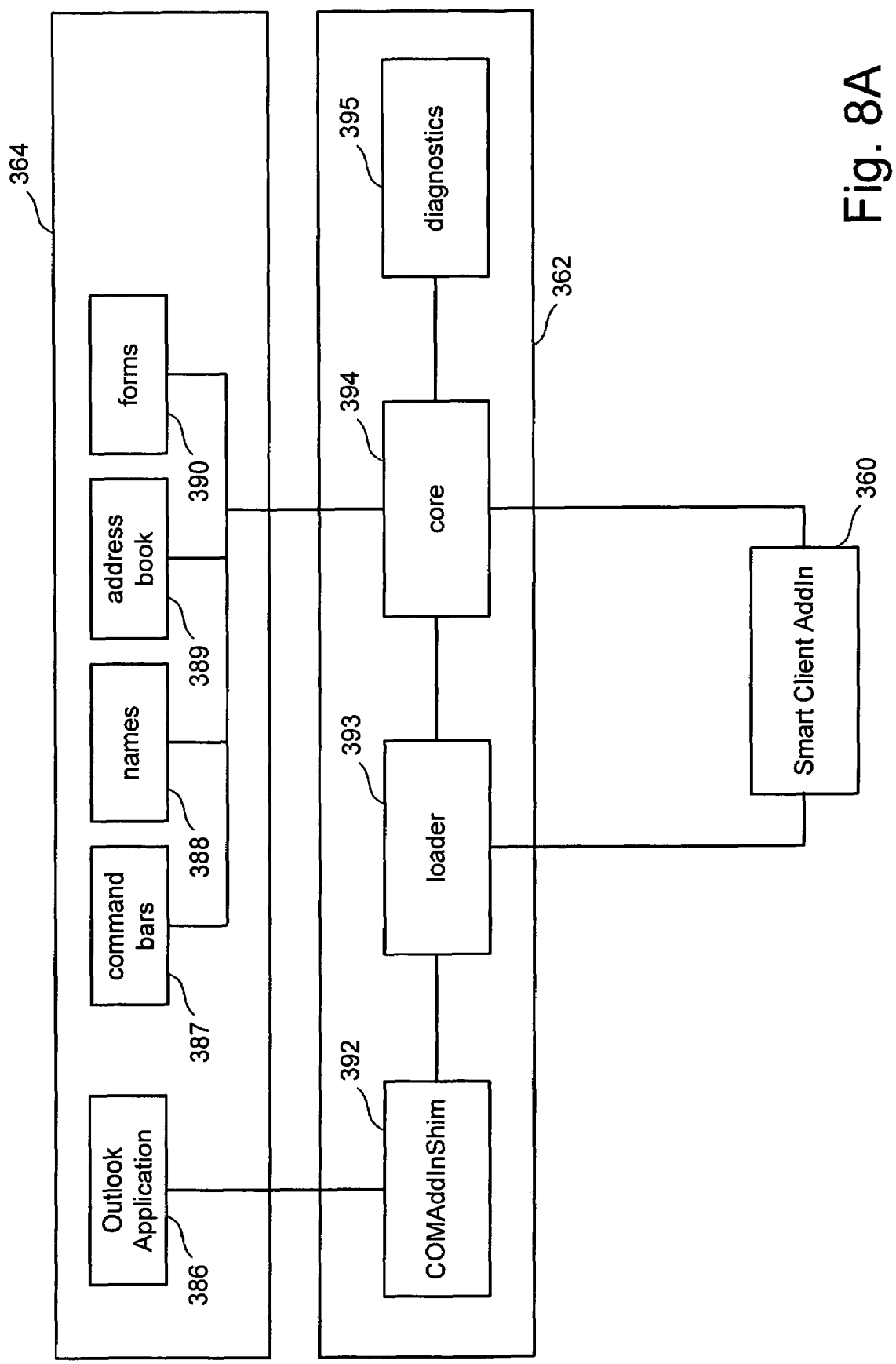
FIG. 8A is a block diagram describing one embodiment of an architecture for an Application Interface.

FIG. 8A is a block diagram describing an architecture for one exemplar embodiment of application interface 362. FIG. 8A shows application 364, which includes Outlook application 386, command bars module 387, names module 388, address book module 389 and forms module 390. Outlook Application 386 is the core collaboration, messaging and scheduling software application. Command bars module 387 is the code for implementing tool bars and menus. Names module 388 provides a list of names for accessing code in Outlook Application 386. Global Address book 389 provides the API for accessing the global address book. Forms module 390 includes the definitions for the various forms used with Outlook Application 386.

Application interface 362 includes COMAddInShim module 392, loader module 393, core module 394 and diagnostics module 395. COMAddInShim module 392 is in communication with Outlook Application 386 and loader module 393. In one embodiment, the communication is bidirectional. In other embodiments, COMAddInShim module 392 receives information from Outlook Application 386 and provides instances of the Outlook Application to loader module 393. COMAddInShim module 392 loads the Smart Client AddIn 360 into memory through an API for Outlook Application 286.

Loader module 393 initializes the Smart Client AddIn 360, starts execution at the main entry point for the Smart Client AddIn 360, and provides an instance of the Outlook Application to the Smart Client AddIn 360. Loader module 393 is also in communication (to or bidirectional) with core module 394.

Core module provides the functions to interact with Outlook. Core 394 provides wrapping classes of Outlook objects with method overloads, standard events and diagnostic handling; implements inheritance chains for objects with common interfaces (Mail, Contact, Task, etc.); implements databindable collections for Outlook collections; provides access to the Global Address Book; and allows for creating custom .NET forms for any item or customization of Outlook forms. Core module 394 is in communication with (to or bidirectional) command bars module 387, names module 388, address book module 389 and forms module 390.

The application interface objects pass all changes to the native objects, thus (in some embodiments) eliminating the need for synchronization. A custom enumerator allows for pass-through enumeration of the native collections such as MAPIFolder items. The system is designed to release native objects as they are no longer used by application interface objects. Native objects are used as the hash key to keep a reference count of all referring application interface objects. Application interface objects inform the cache that they have been finalized (or disposed) to decrement the count and the global registry calls an object to release the native object once there are no more references. The immediate release of the native objects frees up memory resources and improves performance. The application interface wrappers implement method overloads for Outlook object methods with optional parameters and wrap Outlook raised events in standard style events.

Diagnostics module 395, which communicates to core module 394, provides diagnostic services, including error reports and exception handling.

In one embodiment, the Smart Client (including Smart Client AddIn 360, application interface 362 and application 364) can be implemented using hardware, software, or a combination of both hardware and software. For example, the Smart Client can be implemented in a computing device such as a desktop computer, a laptop, a mobile computing device or other computing device. The Smart Client technology is not limited to any specific type of computing device. The data and software used for implementing Smart Client AddIn 360, application interface 362 and application 364 is stored on one or more processor readable storage devices including hard disk drives, CD-ROMs, DVDs, optical disks, floppy disks, tape drives, RAM, ROM, flash memory or other suitable storage devices. In alternative embodiments, some or all of the software can be replaced by dedicated hardware including custom integrated circuits, gate arrays, FPGAs, PLDs, and special purpose processors. In one embodiment, software implementing the above-described components is used to program one or more processors to implement the functions/processes described herein. The one or more processors can be in communication with one or more storage devices (hard disk drives, CD-ROMs, DVDs, optical disks, floppy disks, tape drives, RAM, ROM, flash memory or other suitable storage devices), peripherals (printers, monitors, keyboards, pointing devices) and/or communication interfaces (e.g. network cards, wireless transmitters/receivers, etc.). The Smart Client will communicate with the CRM system via a communication interface.

Figure 9:
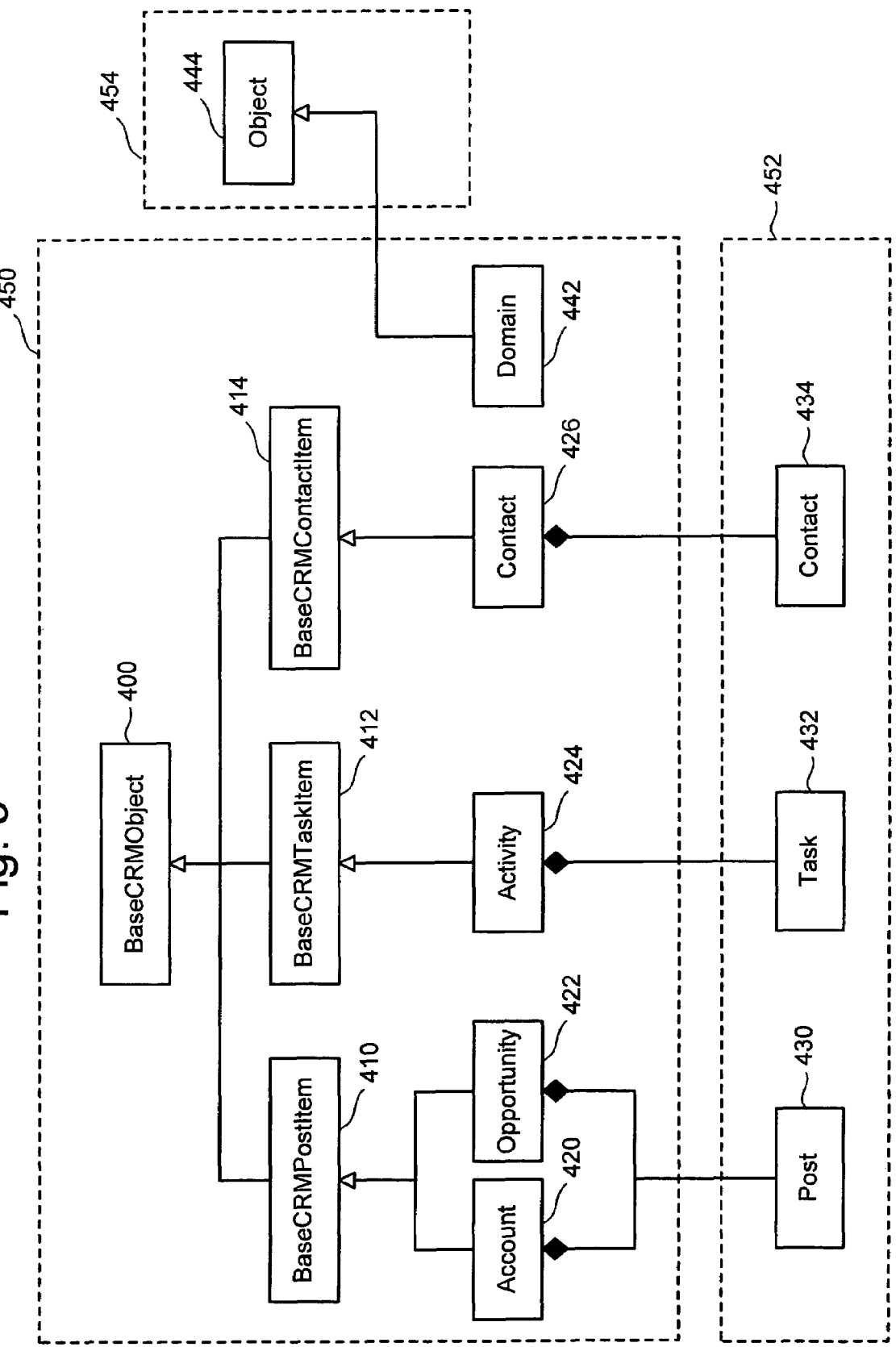
FIG. 9 is a block diagram depicting one example of a class hierarchy.

FIG. 9 depicts the class hierarchy of the various data classes 380 used for the Smart Client. The BaseCRMObject 400 is the base class that encapsulates the common functionality across all transactional objects. That common functionality is implemented using the following fields/properties: CurrentState, IsDirty, IsShadowed, LocalID, ServerID, and ServerTimeStamp. The field CurrentState stores the current state of the object. This field/property will be used by Sync Manager 370 to determine if the object needs to be synchronized to the server. The property could have four possible values: New, InSync, Updated, and InEdit. If the value of CurrentState is New, then the record that has just been created and needs to be synchronized to the server. Subsequent edits to the record will not change the state of the record. Once the record is created on the client, it will remain in the New state until it is synchronized with the server. When the CurrentState of the record is InSync, then the current record is currently being synchronized with the server. When in this state, the record should be read-only. If the current state is Updated, then the record is up-to-date and no sync needs to be performed. If the current state is "InEdit," then the record is currently being edited, and should not be synchronized at this time.

The field/property IsDirty is a boolean value that determines if the record has been modified on the client since the last synchronization. Sync Manager 370 will use this field/property to determine if the record needs to be synchronized to the server. If the field/property IsDirty is set, then the CurrentState field is ignored and the record will be synchronized during the next synchronization cycle.

The field/property IsShadowed determines if the record has a shadow copy. Many items in the Smart Client will have duplicate storage in Outlook®. For example, an activity can appear both in the Activity folder under an account, as well as in the "MyActivities" folder, depending on the ownership of the activity. These items will have multiple copies that need to be dealt with in a special way during synchronization and user edit. This flag alerts the system to update both copies of the data. Alternatively, the system can maintain one copy of the data and store multiple pointers to the data. Thus, a data item being manipulated (e.g., synchronized or edited), which has the IsShadowed field set, will need to make sure that both copies are updated.

The LocalID field/property holds a temporary local identification generated by the client for new records created on the client. The ServerID is a string that holds the identification for the record used by the CRM system. The ServerID is created by the CRM system, and is used to uniquely identify each object date. The ServerTimeStamp field/property holds the server time stamp for the record. This ServerTimeStamp indicates the last date/time that the record was updated on the server.

The BaseCRMObject class 400 encapsulates common functionality using the following methods: Edit, Update, Save and Reset. The Edit method sets up the object for editing on the client. If the record cannot be edited at this time, the method returns false. This would be the case when the synchronization of the record is in progress by Sync Manager 370. The Update method updates the record state appropriately so that the record is marked for synchronization (e.g., the IsDirty field is set). The Save method modifies the record state for the new records created on the client. The Reset method is used to reset the state of the record to the previous date. This is used when the user cancels the update or creation of a new record.

The BaseCRMPostItem class 410, BaseCRMTaskItem class 412 and BaseCRMContactItem class 414 inherit from BaseCRMObject class 400 and implement the necessary functionality specific to the object by appropriately overwriting the base classes. The primary purpose of these three classes is to provide the necessary framework for the actual data classes derived from them. For example, the activity class 424, which is implemented as an Outlook® task item, will inherit from the BaseCRMTaskItem class 412. The Accounts class 420 and Opportunity class 422 inherit from the CRMPostItem class 410 since both Opportunities and Accounts are mapped to Outlook® post items. Finally, Contact class 426 is derived from the BaseCRMContactItem class 414. Introducing this layer in the class hierarchy, allows for additional transaction classes to be created in the future that have the necessary framework in place. These classes aggregate the corresponding Outlook® item internally and provide methods to attach and detach the Outlook® items to the data class object at run time. BaseCRMObject 400, BaseCRMPostItem 410, BaseCRMTaskItem 412, BaseCRMContactItem 414, Account 420, Opportunity 422, Activity 424, and Contact class 426 are all in the Smart Client AddIn namespace 450.

Account class 420 and Opportunity class 422 aggregate post class 430. Activity class 424 aggregates task class 432. Contact class 426 aggregates Contact class 434. Post class 430, Task class 432 and Contact class 434 are in the Outlook® namespace 452. Post class 430 is used to create objects that store the Account and Opportunity records in the Outlook® object data store 366. Task class 432 is used for creating objects that store Activity records in the Outlook® data store 366. Contact class 434 is used to create objects that store contact information in the Outlook® object data store. The primary data fields for these objects are implemented using the custom properties in the Outlook® data object. That is, for each field in the CRM system object (e.g., Account, Opportunity, Activity and Contact), a custom property is created in the Outlook® object (e.g., post 430, task 432 and contact 434). Data sets associated with the items are also stored as a custom property; however, in this case, all data is serialized into an XML string and then stored in the custom property. For example, IT budget information is serialized into an XML string.

In one embodiment, a set of fields that may be used for account objects (e.g., the custom fields in the post object 430) include: address 1, address 2, address 3, city, state, zip code, country, site, name, sub-district, sub-segment, parent level, parent organization, parent site, subsidiary, sales region, sales district, vertical industry, category, phone, fax, website, account team, sales ID, annual revenue and IT budget. Other fields can also be included, including any of the fields discussed above with respect to the user interface, and creating/editing/viewing data for accounts.

In one embodiment, the fields for an opportunity object (e.g., the custom fields in the post object 430) include opportunity name, company name, description, sales stage, due date, opportunity type, opportunity owner, status, currency code, licensing program, licensing subtype, team leader, forecast flag, critical deal flag, closing date and create a date. Other fields can also be included, including any of the fields discussed above with respect to the user interface, and creating/editing/viewing data for opportunities.

In one embodiment, the fields for Activity objects (e.g., the custom fields in the task 432 objects) include description, owner, type, category, purpose, due date, contact name, company name, associated opportunity, status and comments. Other fields can also be included, including any of the fields discussed above with respect to the user interface, and creating/editing/viewing data for activities.

In one embodiment, the fields for a Contact object (e.g., the custom fields in the contact object 434) can include prefix, first name, last name, title, job role, department, e-mail, telephone number, mobile phone number, fax, key contact, company name, customer satisfaction survey flag, work address, and indications whether to allow mail, e-mail, fax and telephone calls. Other fields can also be included, including any of the fields discussed above with respect to the user interface, and creating/editing/viewing data for contacts.

The present discussion is not limited to any particular set of fields. Various embodiments can use different sets of fields as are suited for the particular implementation.

There is also a domain class 442, which is within the Smart Client AddIn namespace 450. This domain class is used to store domain information. In one embodiment, domain information can include configuration information and system information that is not changeable by a user. Examples of system information can include information about links, information about accounts that cannot be changed, information about the User Interface and information about the various menus, etc. Domain class 442 extends object class 444, which is in namespace 454 within the .NET framework.

IV. Converting Data

One feature to increase productivity is to allow for conversion between the CRM (or other application) platform and the Smart Client platform (e.g., the collaboration, messaging and scheduling application platform—Outlook® platform). For example, it may be useful to be able to convert CRM data items to Outlook® data items and/or Outlook® data items to CRM data items.

FIG. 10 is a flowchart describing one embodiment of a process for converting data items from Outlook® to a CRM system (e.g., Siebel CRM system). In step 502, the user requests that a particular data item be converted from an Outlook® data item to a CRM data item. In one embodiment, the user will select "convert to CRM" in the "MyCRM" drop-down menu from top-level menu 10. This request will be for the current data object selected in the list pane. Alternatively, when a user opens an object (e.g., by double-clicking on the object in list pane 16), there can be a drop-down menu item, button, speech recognition tool or other User Interface item to choose to have that particular Outlook® object converted to a particular CRM application object. The User Interface item will provide the ability to select the type of CRM object to create, from the possibilities allowed by the system. After selecting that the Outlook item should be converted to a CRM data item, a pick-list menu is provided to associate the item with an account. A list of possible accounts will be provided. The user can select the account(s) to associate with the new CRM data item.

In step 504, a CRM object in the Outlook® namespace 452 is created. Thus, if the CRM object is to be a contact, then a contact object 434 is created. If the CRM object to be created is an activity object, then a task object 432 is created. If the CRM object is to be an account object or opportunity object, than a post object 430 is created. In step 506, the relevant data in the Outlook® object is accessed from the Outlook® object. In some embodiments, not all the data will be converted to the CRM object. A set of rules will define which data should be and should not be converted, as will be discussed below. In step 508, the data accessed in step 506 is automatically filled into various fields in the new CRM object created in step 504. In step 510, additional default data is automatically added to the new CRM object. Note that in some embodiments, step 510 can be performed prior to step 508 and/or prior to step 506. The default data can be chosen based on the user alias. That is, when a user logs into a computer by providing credentials (user name/alias and password), the system knows who the user is. Based on the identity of the user, the system can determine certain default data.

In step 512, a pop-up form (similar to the pop-up forms discussed above for activities, opportunities and contacts) will be presented with the data from the newly created CRM object. In step 514, the user will have an opportunity to edit that data. In step 516, in response to a user requesting that the data be saved, the new object is saved in the Outlook® data store in step 516. In step 518, the Outlook® data store is synchronized with the CRM data store so that the newly created object (based on the conversion from the Outlook® object) is stored in the CRM system. Note that the synchronization could happen immediately or could happen later in time (e.g., at a scheduled synchronization time).

FIG. 11 is a flowchart describing one embodiment of a process for converting CRM objects to Outlook® objects. For example, the user may want a contact in the CRM system to be added to the user's Outlook® contacts. To do so, the process of FIG. 11 will be performed.

In step 542 of FIG. 11, the user request that the current CRM object be converted to an Outlook® item. For example, the user may select a CRM object in list pane 16. The user can choose an option to convert to Outlook® from a drop-down menu in the "MyCRM" top-level menu 510. Additionally, if the user is accessing a pop-up form, the pop-up form may include a drop-down menu, button or other User Interface item to convert to Outlook®. That User Interface item will provide a choice as to which type of Outlook® item to be converted to, from the allowed possibilities.

In step 544, a new Outlook® object will be created in response to the request in step 542. The Outlook® object created will be the standard Outlook® object used for the Outlook® software application and stored in the Outlook® data store 366. In step 546, the relevant data to be converted will be accessed. Note that not all the data from a CRM system object will be converted to Outlook®. Which specific fields will be converted will be predefined in advance, as explained below. Those predefined fields are accessed in step 546. In step 548, those fields accessed in step 546 are automatically filled into the appropriate fields in the Outlook® object. In step 550, default data is automatically added to the Outlook® object. In some embodiments, some or all of the default data can be based on a user alias, the account for which the object in the CRM is relevant to, or other criteria. In step 552, the date for the newly created Outlook® item is displayed in an editable form. In step 554, the user is provided the ability to edit the data in the newly created Outlook® object. In step 556, the user can save the new Outlook® item, which will cause the GUI to update.

In one embodiment, a CRM opportunity can be converted to an Outlook® calendar appointment. An Outlook® e-mail and Outlook® calendar appointment can both be converted to a CRM opportunity. A CRM activity can be converted to an Outlook® calendar appointment or an Outlook® task. Both the Outlook® calendar appointment and the Outlook® task can be converted to a CRM activity. A CRM contact can be converted to an Outlook® contact. An Outlook® contact, an Outlook® e-mail message and an Outlook® calendar appointment can be converted to a CRM contact. Each of these conversions will be discussed in more detail below. Note that systems that perform less than the above-listed conversion or perform additional/different conversions are also within the scope of this discussion.

When converting an Outlook® calendar appointment to a CRM opportunity, the following fields are automatically filled in the new CRM opportunity object (step 508) based on reading from the Outlook® object (step 506). First, the subject line of the appointment is stored in the opportunity name field of the opportunity object. Second, the text or description field of the Outlook® appointment is stored in the opportunity description field of the opportunity object. Third, the user alias for the user operating the Outlook® system is added to the opportunity owner field of the CRM opportunity object. Additionally, the following fields receive default data (step 510): type, status, sales stage, currency code, opportunity team primary record, and opportunity team "active" flag. The type field is loaded with the string "standard." The status field is loaded as active. The sales stage is chosen as "prospect 0%." The currency code is set as U.S. dollars. The opportunity team primary record includes the user alias. The opportunity team active flag is set as True. Additionally, in some embodiments, the user is provided a dialogue box in which to associate the newly created opportunity with an existing account for that user.

When an e-mail item in Outlook® is converted to an opportunity object in the CRM system, the e-mail subject line becomes the opportunity name, the e-mail text becomes the opportunity description and the Outlook® alias becomes the opportunity owner. Additionally, type, status, sales stage, currency code, opportunity team primary record and opportunity team "active" flag are set to default data as described above with respect to a calendar appointment.

When a CRM opportunity item is converted to an Outlook® calendar appointment, the opportunity name is loaded into the subject field of the appointment, the opportunity description is loaded into the description or text field of the appointment and the opportunity due date is loaded into the start-time date and end-time date of the calendar appointment. Additionally, the all-day-event flag in the Outlook® object is set to indicate an all day event.

When converting a CRM activity to an Outlook® calendar appointment, the activity description field is mapped to the Outlook® subject field, the activity due date is mapped to the calendar appointment date and the activity comments are mapped to the calendar appointment text. When converting a CRM activity to an Outlook® task, the activity description is mapped to the Outlook® task subject field, the activity due date is mapped to the task due date and the activity comment field is mapped to the task text.

When converting an Outlook® calendar appointment to a new CRM activity, the subject line of the calendar appointment is mapped to the activity description, the calendar appointment date is mapped to the activity due date, the calendar appointment text is mapped to the activity comments field, and the alias of the user operating Outlook® is mapped to the activity owner field. Additionally, the activity type field is defaulted to "meeting."

When an Outlook® e-mail item is being converted to a CRM activity, the e-mail subject line is mapped to the activity description field, the e-mail text is mapped to the activity comments field and the Outlook® alias for the e-mail user is mapped to the activity owner.

When converting an Outlook® task to a CRM activity, the task subject field is mapped to the activity description field, the task due date field is mapped to the activity due date field, the text is mapped to the activity comments and the Outlook® alias is mapped to the activity owner.

When converting from an Outlook® calendar appointment to a CRM contact, the title of the calendar appointment maps to the prefix of the CRM contact, the from (last name) field of the Outlook® appointment is mapped to the last name of the CRM contact, the from (first name) field of the Outlook® appointment is mapped to the first name of the CRM contact, sender's e-mail address is mapped to the primary e-mail address for the CRM contact and the Outlook® alias is mapped to the contact team primary field for the CRM contact object. Additionally, the key contact field of the CRM contact is defaulted to be "Yes."

When converting from an Outlook® e-mail to a CRM contact, the title of the e-mail maps to the prefix of the contact, the from field (last name) maps to the last name of the contact, the from field (first name) maps to the first name of the contact, the sender's e-mail address maps to the primary e-mail address for the contact, and the Outlook® alias maps to the contact team primary name. Additionally, the key contact field is set to the value "Yes."

When converting between Outlook® contacts and CRM contacts, the following mappings apply: the title in Outlook® contact maps to the prefix in the CRM contact, the last name of the Outlook® contact maps to the last name of the CRM contact, the first name in the Outlook® contact maps to the first name in the CRM contact object, the e-mail address of the Outlook® contact maps to the primary e-mail address for the CRM contact, the business phone for the Outlook® contact maps to the phone number field for the CRM contact, the user alias for the Outlook® user maps to the contact team primary field for the CRM contact, the mobile phone field for the Outlook® contact maps to the mobile phone field for the CRM contact, and the fax field for the Outlook® contact maps to the fax field for the CRM contact. When creating a CRM contact, the key contact field is defaulted to "Yes." Additionally, if the subsidiary is clear (based on the user's choice of account), then that data can automatically be filled in by default.

Note that in one embodiment, all Outlook objects converted to CRM objects are smart tagged. That is, the Smart Client AddIn adds a smart tag (e.g., custom field or text in a description field) to Outlook® e-mails, calendar appointments, contacts and tasks after they have been converted to Siebel records with a message indicating "This Outlook® item was converted to a Siebel record on the following date by the following alias." In one embodiment, the smart tag will identify the serverID of the Siebel record.

Similarly, a smart tag can be added to an Outlook® item that was created from a Siebel record. The smart tag can include the serverID of the Siebel record.

V. Synchronization

The Smart Client can be synchronized with multiple systems in order to bring together and update data from various systems. Sync Manager 370 is responsible for this synchronization process between Outlook® storage 366 and the CRM system (and other systems) using agent 372 (communicating via web services 302). Sync Manager 370 will run as a separate worker thread on a defined schedule. The schedule will be retrieved from the configuration file (stored in configuration data store 384) at the time that the Smart Client AddIn 360 starts up. There can be different schedules for different types of data. For example, the schedule for transactional CRM data can call for more frequent synchronizations than the schedule for domain data. Sync Manager 370 will also support an on-demand synchronization, meaning that a user, via the User Interface, can request a synchronization cycle to be performed immediately. For example, user can select "MyCRM" from the drop-down menu 10 to select that a synchronization process be performed immediately. The user can also use the drop-down menu to change the configuration data and force new configuration data to be loaded with a different synchronization schedule.

In one embodiment, the synchronization configuration information includes at least three data items: domainfrequency, transactionfrequency, and syncofflinefrequency. The domainfrequency is the time in minutes after which domain data needs to be synchronized after the last synchronization. Transactionfrequency is the time in minutes after which transactional data needs to be synchronized after the last synchronization. Syncofflinefrequency is the time in minutes after which the synchronization thread wakes up to determine the online/offline status of Outlook®. In one embodiment, the configuration for the Smart Client AddIn will be implanted using an XML file. The following is an example configuration file:

```
<? xml version="1.0" encoding="utf-8" ?>
<CEConfig>
    <Agent>
        <SWSServerName>ju24nm</SWSServerName>
        <SecureHttp>0</SecureHttp>
        <AccountReadUrl>/SiebelRead/Account.asmx</AccountReadUrl>
        <AccountWriteUrl>/SiebelWrite/Account/AccountWrite.asmx
        </AccountWriteUrl>
        <DomainReadUrl>/siebelread/Domain.asmx</DomainReadUrl>
    </Agent>
    <!-- The frequency values would be in minutes example
    for 10min, 120 for 2 hours -->
    <SyncFrequency>
        <DomainFrequency>120</DomainFrequency>
        <TransactionFrequency>5</TransactionFrequency>
        <SyncOfflineFrequency>1</SyncOfflineFrequency>
        <LastServerSyncSchedule>2004-01-
14T11:45:39.0000000-08:00
        </LastServerSyncSchedule>
    </SyncFrequency>
    <LocalData>
        <DomainData>
            <Products>Domain/Products.xml</Products>
            <Services>Domain/Services.xml</Services>
            ...
        </DomainData>
    </LocalData>
</CEConfig>
```

In the above XML code, the <Agent> section will contain the configuration items required by the agent component. This includes a server name for the Siebel web services and the relative URL endpoints to the various Siebel web services. The <Sync Frequency> section will contain the synchronization schedule related configuration information. The <local data> section will contact all the configuration items related to the local storage in the client machine such as pass-through domain files. In some embodiments, the synchronization of account data is preset (e.g., 30 days). In other embodiments, the configuration file will include an entry for setting the synchronization period for account data.

The synchronization manager will check the above file to determine the various times to perform synchronization. In light of that configuration information, Sync Manager 370 will perform a synchronization cycle. In one embodiment, a synchronization cycle is defined as performing an up sync operation followed by a down sync operation. An up sync operation is the process of synchronizing the changes and/or additions made to CRM data objects on the Smart Client with the server. A down sync operation is the process of retrieving updated and new records from the server and updating the Smart Client copy of those records.

Figure 12:
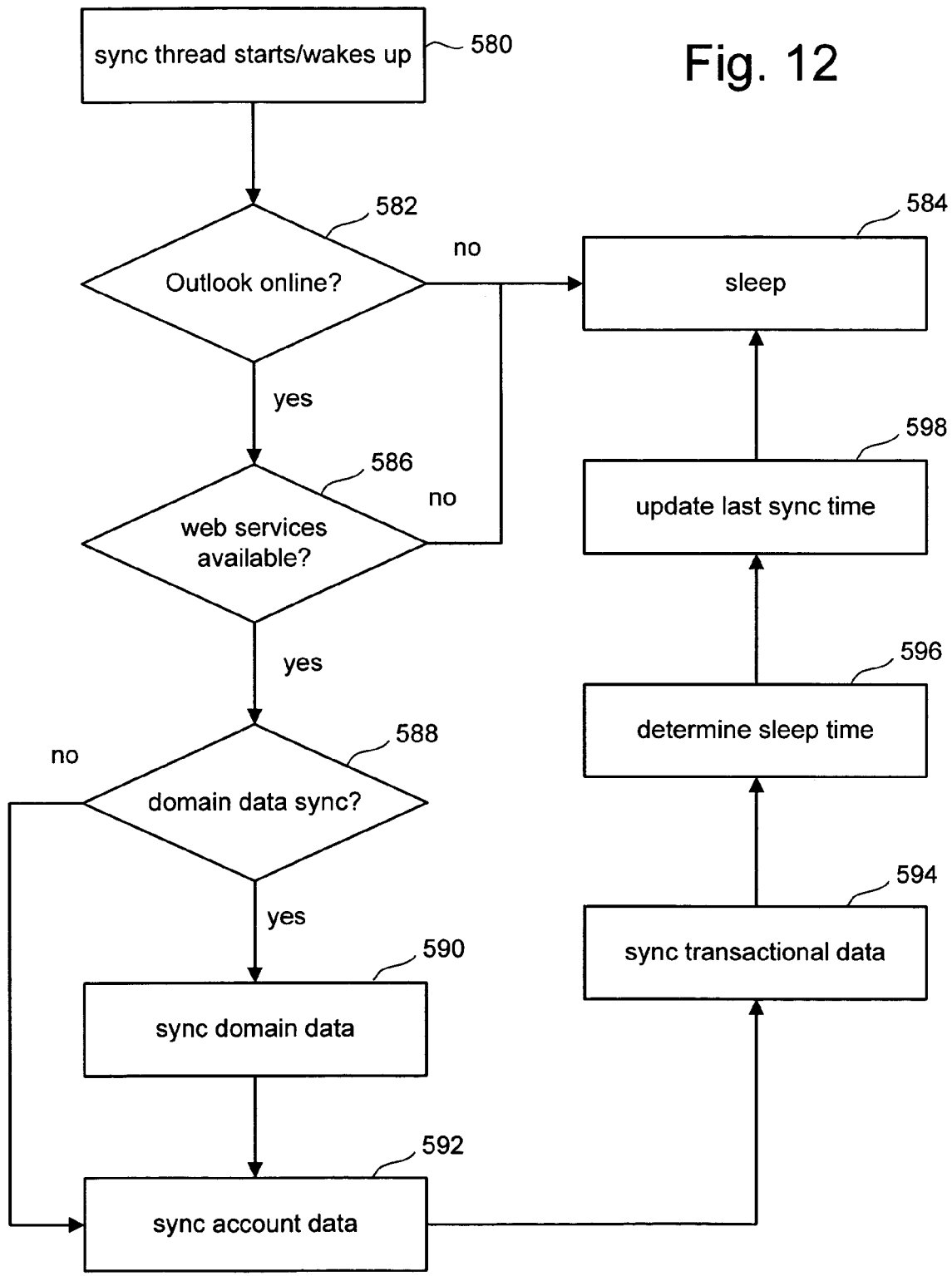
FIG. 12 is a flowchart describing one embodiment of a process for synchronizing data.

FIG. 12 is flowchart describing one embodiment of the process for performing a synchronization cycle. In step 580, the sync thread starts/wakes up. In step 582, the sync thread determines whether Outlook® is online. If Outlook® is not online, then the sync thread goes back to sleep in step 584. If Outlook® is online, then the sync thread determines whether web services 302 is available at step 586. This is done using agent 372. If web services are not available, then the sync thread goes back to sleep in step 584. If web services are available, then in step 588 it is determined whether the domain data needs to be synchronized. Domain data is system data that is typically not changed by the user. In one embodiment, the domain data is synchronized every 30 days. In other embodiments, other time periods can be used. If the domain data is to be synchronized, then that domain data is synchronized in step 590. In step 592, account data is synchronized. Account data is information about each of the various accounts, and is not typically changed by the user. If, in step 588, it is determined that no domain data needs to be synchronized then the process continues with synchronizing the account data that needs to be synchronized (if it is time to synchronize account data) in step 592 without synchronizing domain data. After synchronizing account data, transactional data that needs to be synchronized is synchronized in step 594 (if it is time to synchronize transactional data). Transactional data is the variable data about Contacts, Opportunities and Activities, which typically can be changed by the user. In step 596, it is determined how much time the sync thread should sleep. This is based on the configuration information described above. In step 598, the system stores the time that the last synchronization was made for transactional data, account data and/or domain data. Then, in step 584, the sync thread goes to sleep. There is some account data that may possible by read-only.

Figure 13:
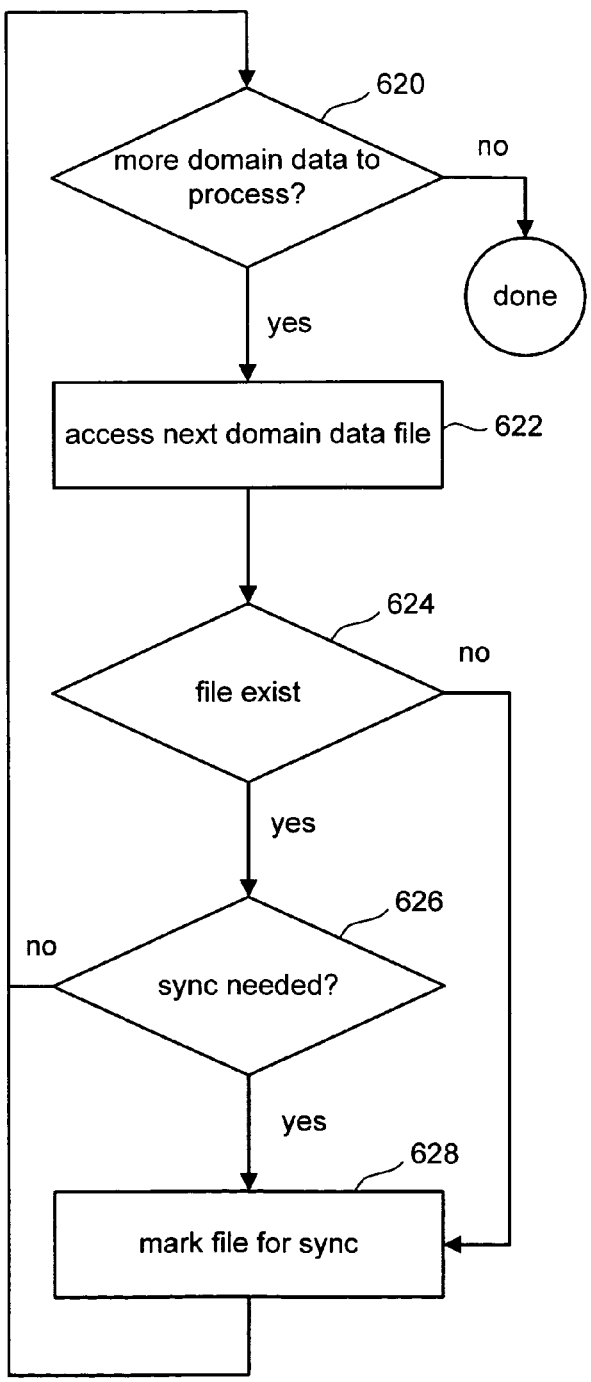
FIG. 13 is a flowchart describing one embodiment of a process used when synchronizing domain data.
Figure 14:
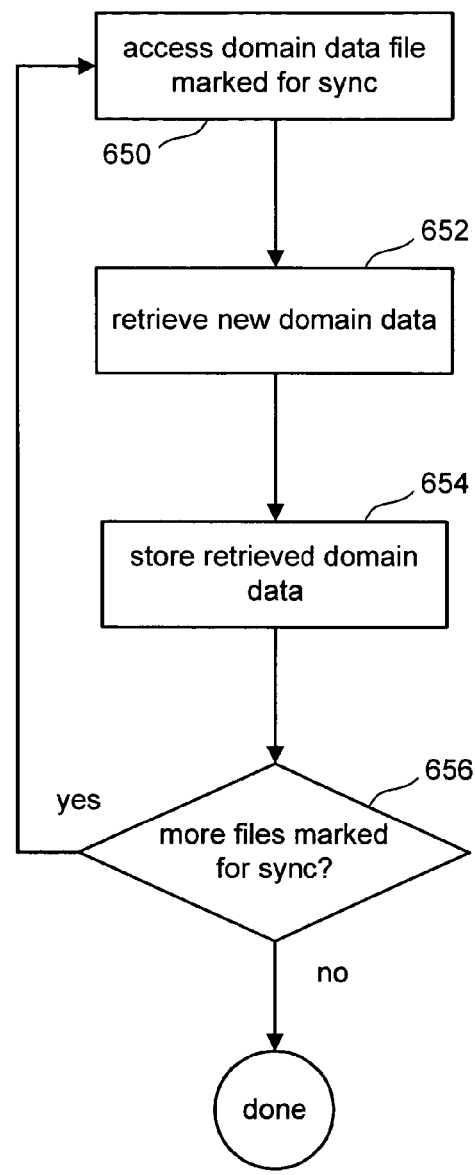
FIG. 14 is a flowchart describing one embodiment of a process used when synchronizing domain data.

FIG. 13 and FIG. 14 are flowcharts describing more detail for synchronizing domain data (step 590 of FIG. 12). The processes of FIGS. 13 and 14 are independent threads, which can run serially or concurrently. In step 620 of FIG. 13, it is determined whether there is more domain data to process. The first time this step is run, there is likely to be domain data. When all the domain data has processed, the method of FIG. 13 is completed. If there is more domain data to process, then in step 622 the next domain data file is accessed. In one embodiment, domain data is stored in domain data files. Typically, the system will have a list of domain data files to look for. In step 624, if the particular file that the system is looking for exists, then it is determined whether the domain data needs to be synchronized at step 626. If the domain data is not to be synchronized, then the process loops back to step 620. If the domain data does need to be synchronized at step 626, then that particular file is marked for synchronization in step 628 and the process then loops back to step 620. If, in step 624, it is determined that the file does not exist, then the file is marked for synchronization. Typically, with domain data synchronization, the domain data stored on the CRM server is written to the Smart Client. There is no up-sync from the Smart Client to the server. Thus, if a file does not exist, then the file has to be retrieved from the server. If the file is too old and needs to be synchronized, then the file is overwritten by the current file still on the server.

The process of FIG. 14 includes the steps for retrieving the data from the server. The system loops through all the domain data files that need to be synchronized. One data file is accessed in step 650. New domain data for that data file is retrieved from the server in step 652. That retrieved domain data is stored in the accessed file in step 654. If there are no more files to consider at step 656, the process of FIG. 14 is done. If there are more files to consider at step 656, then the process loops back to 650 so that additional data can be retrieved.

Figure 15:
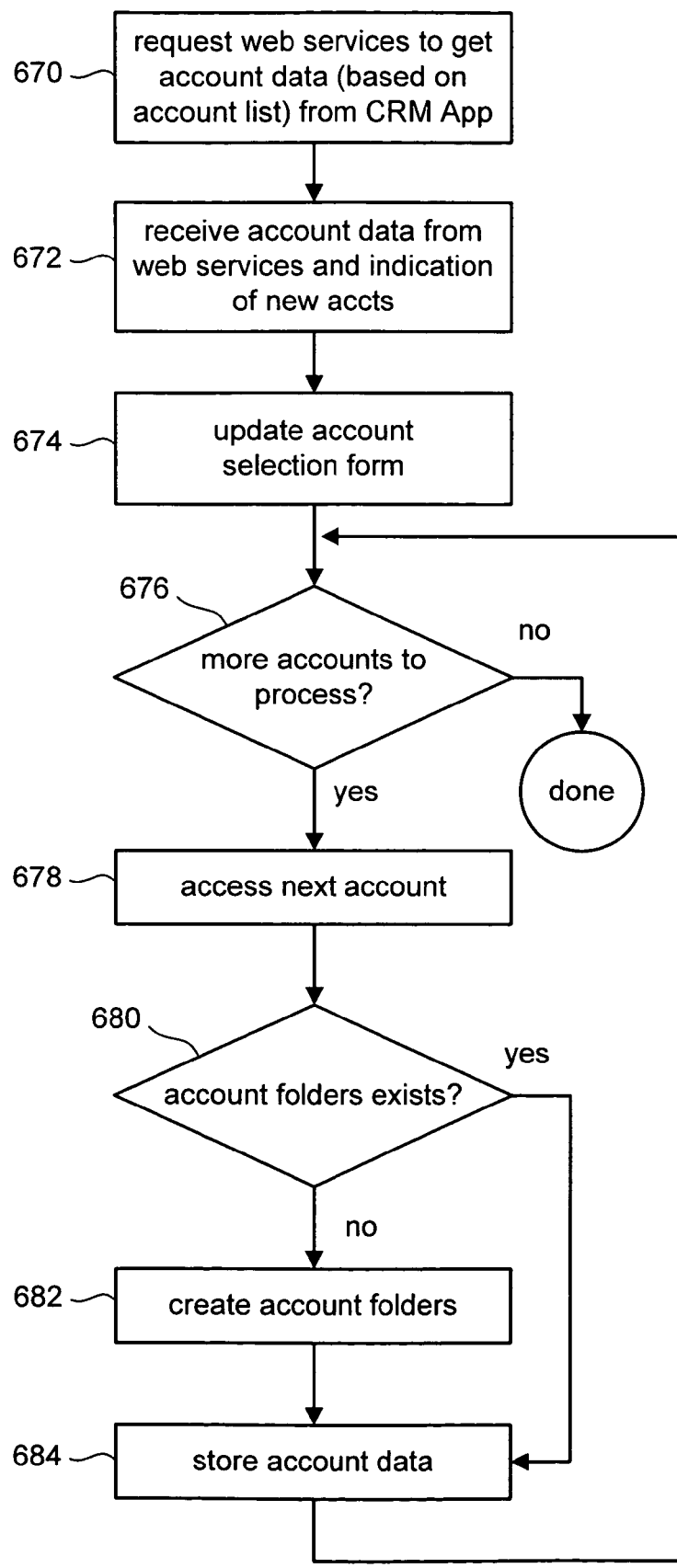
FIG. 15 is a flowchart describing one embodiment of a process used when synchronizing account data.
Figure 16:
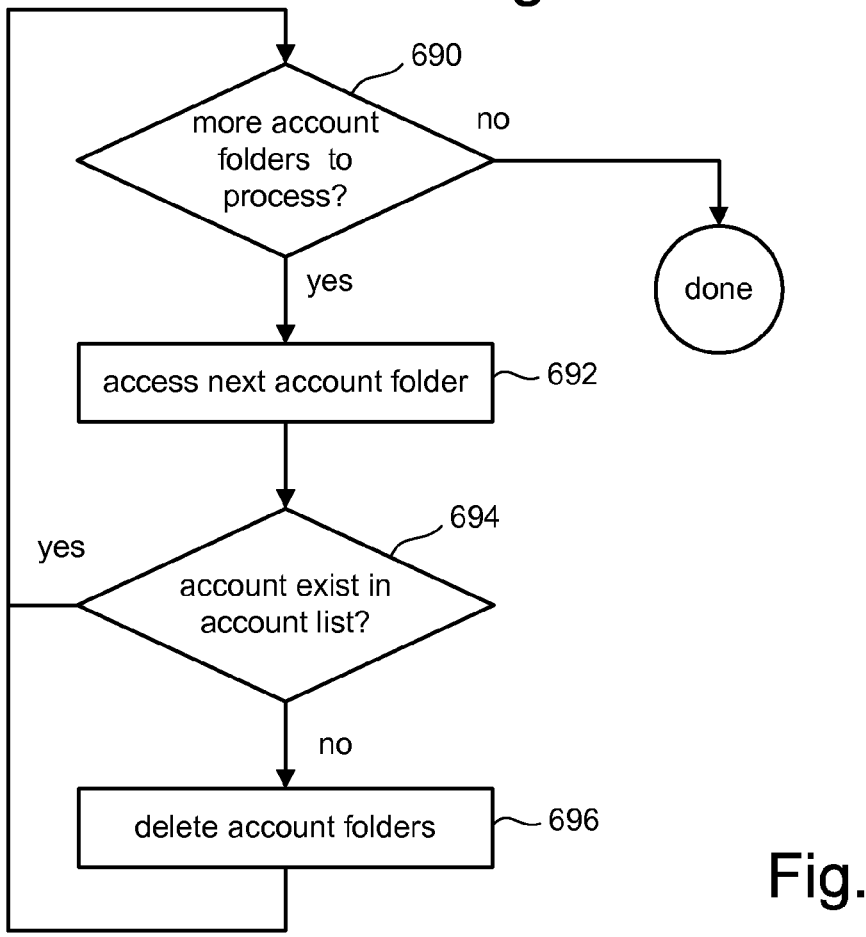
FIG. 16 is a flowchart describing one embodiment of a process for deleting account folders no longer needed.
Figure 17:
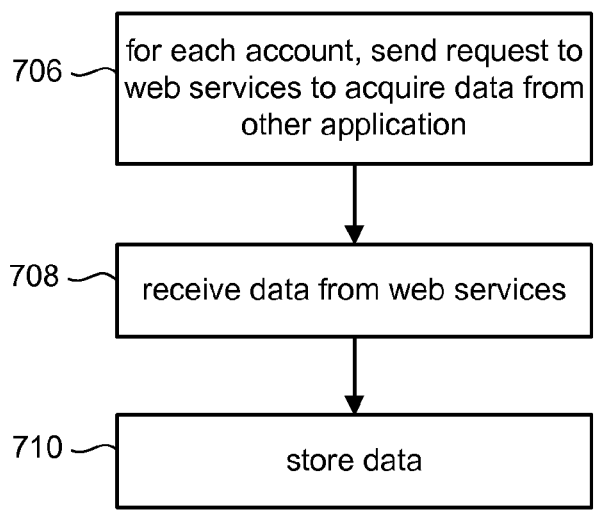
FIG. 17 is a flowchart describing one embodiment of a process for acquiring data from other applications.

FIGS. 15, 16 and 17 provide more detail of the process for synchronizing account data (step 592 of FIG. 12). FIG. 15 provides the overall process for synchronizing account data. FIG. 16 describes the process for deleting old account folders. FIG. 17 provides details about the process for accessing data from other applications. In one embodiment, each of the processes of FIGS. 15, 16 and 17 are separate threads running concurrently or serially. In some embodiments, the threads can be dependent upon each other.

In step 670 of FIG. 15, Service Manager 370 makes a request to agent 372 to get account data from the CRM application. Sync Manager 370 will have a list of accounts. This is called the account list. For each account on the account list, a request is made to web services 302 to get account data for that account. In step 672, the account data is received from web services 302. In addition, any new accounts that were created on the server since the last synchronization are sent back to Sync Manager 370. In step 674, a dialogue box (also called a pick list) will be presented with a list of all the accounts for which there is data. This will include accounts previously picked by the user, accounts that are new and accounts that were not selected by the user in the past. The user can then choose to add or subtract accounts from the list of accounts for which the Smart Client will track records. After the user chooses the accounts to proceed with, the account list is updated accordingly. Data will be updated for each of those accounts in the following steps and the folders on the GUI of FIG. 1 will be updated. In step 676, it is determined whether there are any more accounts that need to be processed. If this is the first time step 676 is being performed, then there will be accounts to process. If there are no more accounts to process, then the method of FIG. 15 is completed. If there are more accounts to process, then the next account is accessed in step 678.

In step 680, the system determines whether a subfolder under the "MyAccounts" subfolder exists. If so, the new account data is stored in the appropriate folders in step 684. If not, the appropriate folders are created in step 682 and the account data is stored in step 684. In one embodiment, the appropriate folders created in step 682 include the account folder, and subfolders for activities, opportunities and contacts. After step 684, the process loops back to step 676 to determine whether there are any more accounts, which the user selected in step 674, that have not been processed yet. If so, the process continues with step 678. Otherwise, the method of FIG. 15 is completed.

Considering the process of FIG. 16, in step 690, the thread determines whether there are any more account folders that need to be processed for this method. That is, the thread looks at each account folder under "MyAccount" folder. If all the account folders have been processed, then the method of FIG. 16 is completed. If there are more account folders to process, then the next account folder to process is accessed in step 692. The thread determines whether that account folder corresponds to an account that exists in the account list at step 694. Remember that the user was able to adjust the account list in step 674. If the account folder exists in the account list at step 694, then the system loops back to step 690. If the account does not exist in the account list at step 694, then the account folders (e.g., the account folder and the subfolders for Contacts, Opportunities and Activities) are deleted in step 696. After step 696, the method loops back to step 690.

FIG. 17 describes a flowchart describing the process for acquiring data from applications other than the CRM software system. For example, in one embodiment, if the user selects an item in the accounts list pane other than Account Profile, the system will display information from another external system other than the CRM system. The process of FIG. 17 describes how to synchronize that data. In one embodiment, the data is synchronized by obtaining the most up-to-date data from the external application and using that data to overwrite whatever is stored on the client side. In step 706, for each account, Sync Manager 370 will send a request to web services 302 to acquire data from the particular application. In step 708, data will be received back from web services 302. In step 710, that data is stored on the Smart Client. Examples of other applications include service incidents applications which store and track service incidents for a company and applications which track sales history. In one embodiment, instead of using web services, Sync Manager (via Agent 372) can contact the external application directly.

Figure 18:
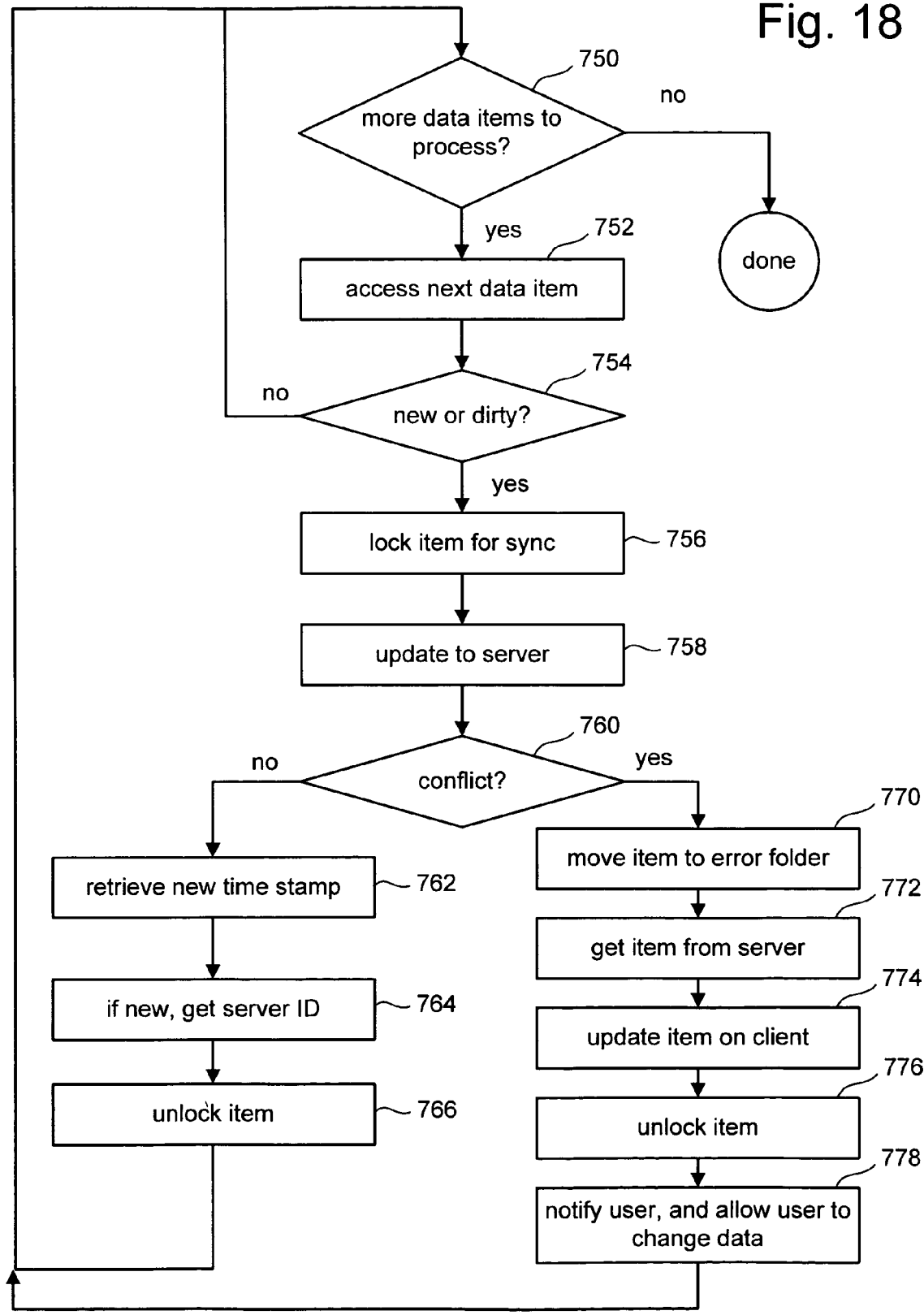
FIG. 18 is a flowchart describing one embodiment of a process for synchronizing transactional data.
Figure 19:
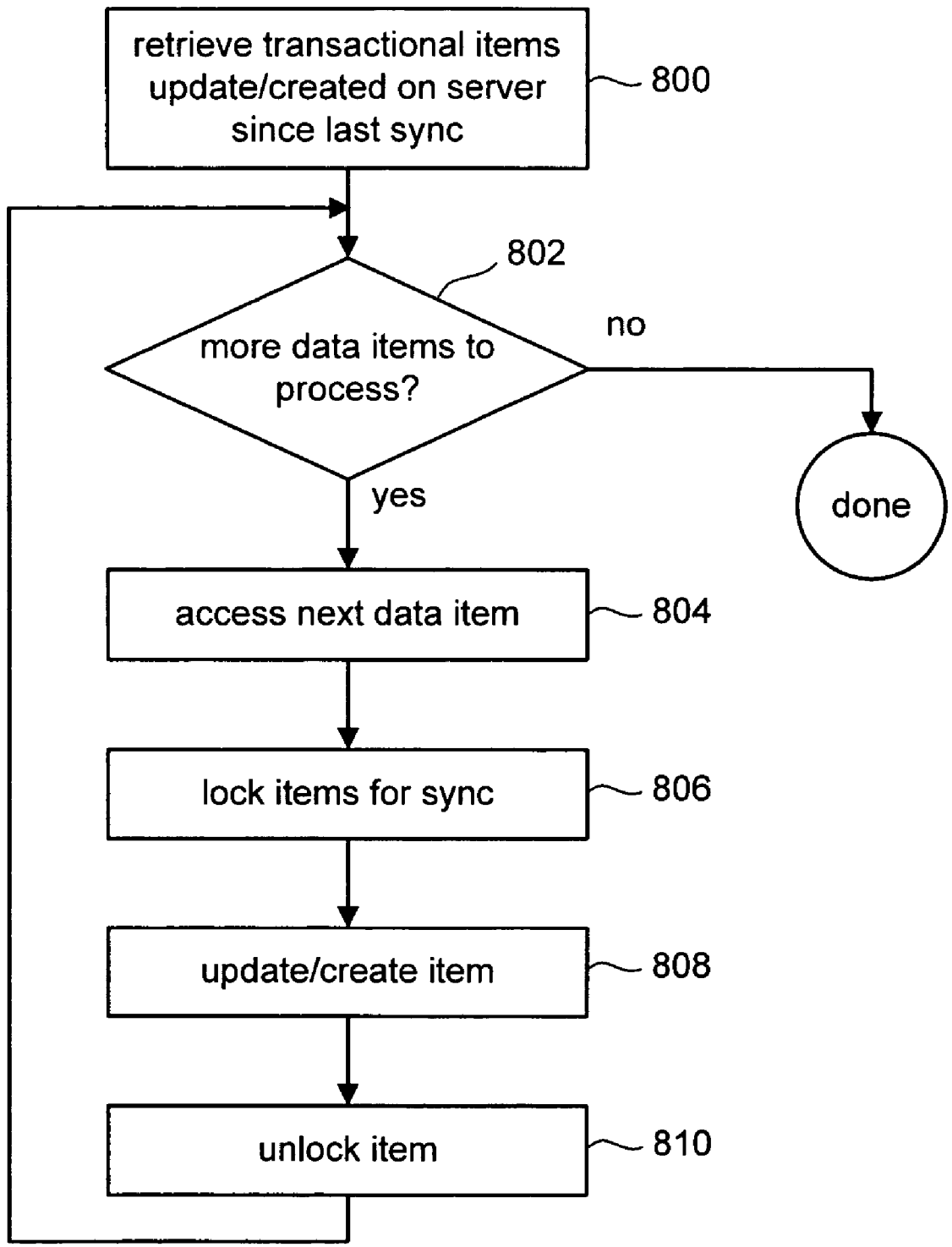
FIG. 19 is a flowchart describing one embodiment of a process for synchronizing transactional data.
Figure 20:
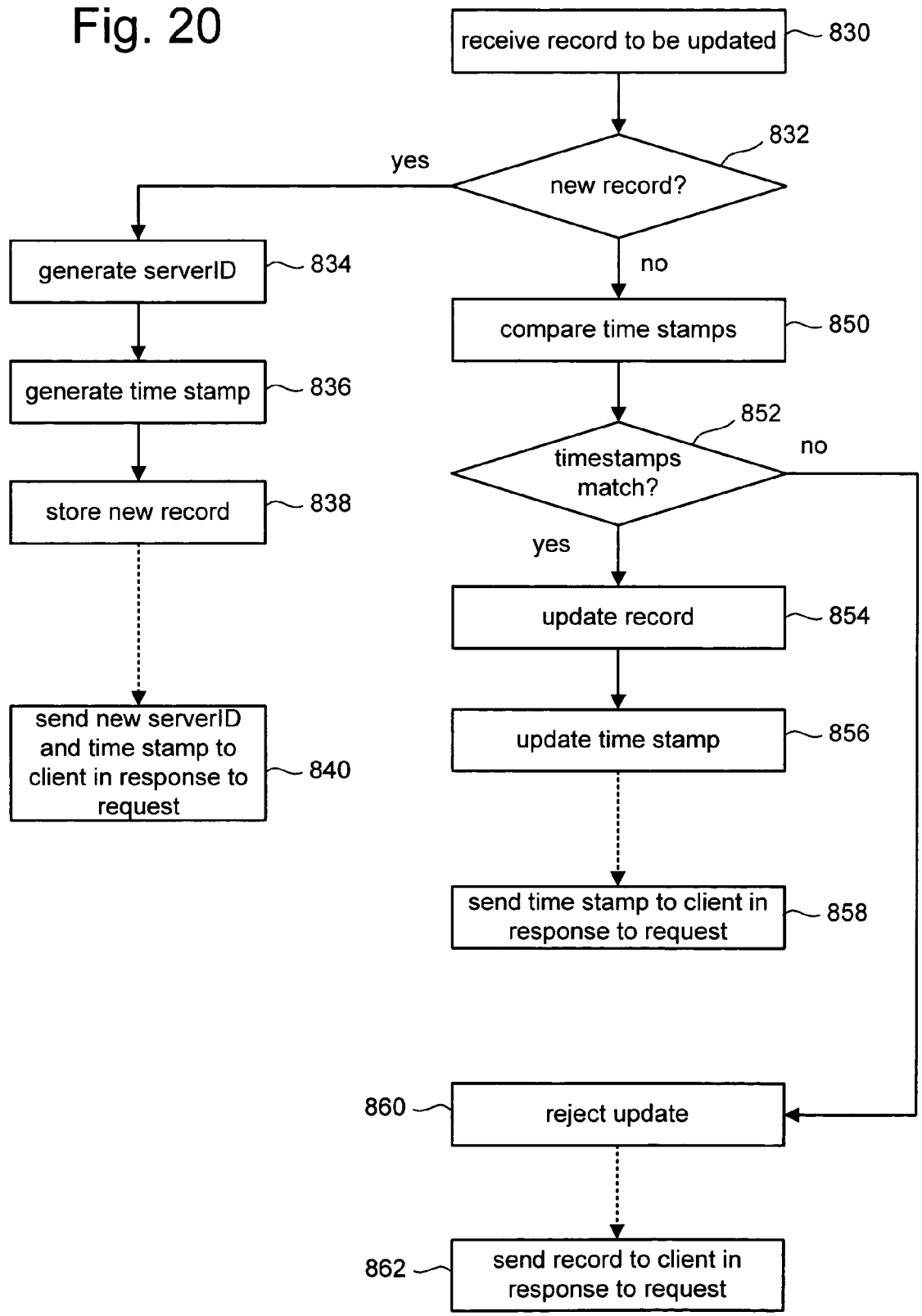
FIG. 20 is a flowchart describing one embodiment of a process that is performed on the server side and is for synchronizing transactional data.
Figure 21:
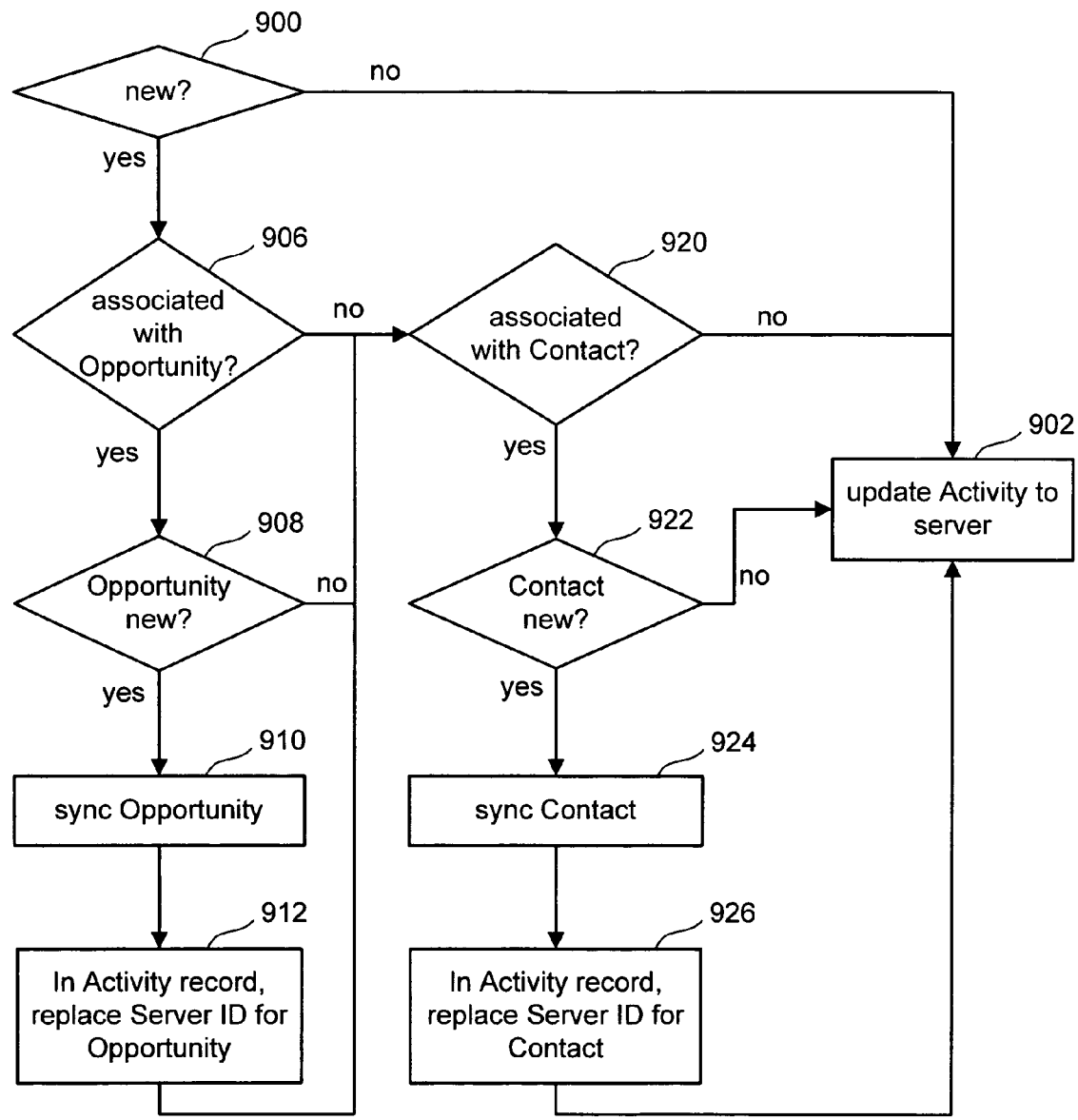
FIG. 21 is a flowchart describing one embodiment of a process used when synchronizing activity data.

FIGS. 18-21 provide more details of the process for synchronizing transactional data (step 594 of FIG. 12). FIG. 18 describes the up-sync process. FIG. 19 describes the down-sync process. FIG. 20 describes the process performed on the server for the CRM application. FIG. 21 provides further detail of special steps performed for activities.

In step 750 of FIG. 18, the system determines whether there are more data items to process. A data item can be any of the transactional items for any of the accounts. For example, a data item can be an activity, an opportunity or a contact. When there are no more items to process (all items to be synchronized have been synchronized), then the process of FIG. 18 is completed. If there are more items to process, then in step 752, the system accesses the next data item. In step 754, the system will look at the IsDirty field of the accessed object to determine whether the data is dirty. If the data is not dirty and not new, then it does not need to be synchronized and the process loops to 750. If the data is dirty or it is new (CurrentState=New), then the data item needs to be synchronized. In step 756, the data item is locked from editing. In step 758, the data item is updated to the server. That is, the data item is sent to the server via agent 372 and web services 302. In step 760, the thread receives an indication back from the agent (via web services 302) whether there was a conflict. The determination of whether there is a conflict is performed by the server (CRM software system) and sent back to web services 302 from the server. If there is no conflict, then the Smart Client will request the time stamp for the synchronization from the server. The server will send a time stamp and it will be received by the Smart Client in step 762. If the data item being synchronized is a new data item, then the ServerID will be requested from the server and received in step 764. That ServerID will be stored in the object. Prior to receiving the ServerID, the Smart Client will reference the object by the LocalID. After receiving the ServerID, the Smart Client will reference the object by the ServerID. In step 766, the data item is unlocked and the process loops back to step 750 so that the next data item can be processed.

If in step 760, it is determined that there was a conflict, then the data item is moved to an error folder in step 770. Looking back at FIG. 1, in the navigation pane there is a folder marked "System." Underneath that system folder are a set of error folders. A copy of the data item will be stored in one of the error folders for viewing by a user. In step 772, the thread will request and receive that data item from the server. That data item will come with a ServerID and time stamp in the data item. In step 774, the data item received from the server is updated by replacing the data item on the client. In step 776, the data item is unlocked. In step 778, the user is notified that the data was changed and that there was a conflict. In one example, the user is sent an e-mail. After step 778, the process loops back to step 750 so that the next data item can be accessed.

FIG. 19 provides more details of the down-sync process. In step 800 of FIG. 19, the Sync Manager will request and receive a list of transactional items that have been updated or created on the server since the last synchronization. If there are more items to consider on the list, then in step 804, the next data item will be accessed. In step 806, the data item on the Smart Client will be locked. In step 808, the Sync Manager will retrieve the data on the server for that item and update the item on the Smart Client with the new data. If it is a new data item, then the item will be created on the Smart Client in step 808. In step 810, the data item is unlocked and the process loops back to step 802 to determine whether there are anymore data items to process. When all the data items are processed, the method of FIG. 19 is completed.

In one embodiment, the up-sync process is performed first and the down-sync process is performed second. In other embodiments, the two processes can overlap or be performed with other timing.

FIG. 20 is a flowchart describing one embodiment of a process that is performed on the server side. In step 830, a record to be updated is received by the CRM application server. In step 832, it is determined whether the record is a new record or an existing record. If it is a new record, the server will generate a new ServerID in step 834 and a time stamp is step 836. The new record, with the time stamp and ServerID, is stored in step 838. Some time later (as indicated by the dotted line), in step 840, the server will send the new ServerID and time stamp, in response to steps 762 and 764.

If the record received in step 830 is an existing record, then in step 852 the time stamp for the received record and the existing record are compared at step 850. If the time stamps match (e.g., they are the same), then the record on the server is updated in step 854 based on the data received from the Smart Client. In step 856, the time stamp of that record is updated on the server. Some time later (as indicated by the dotted line), in response to step 762, the server will send the updated time stamp to the Smart Client in step 858.

If the time stamps do not match (step 852), then the update is rejected in step 860 and the record received from the Smart Client will not be used to update the corresponding record on the server. Later (as indicated by the dotted line), in step 862, the server will send a copy of its record to the client in response to a request from the client (e.g., step 772 of FIG. 18).

As can be seen, the Smart Client does not change the time stamp. The time stamp represents the last time the server updated its records. Thus, if the time stamp on the server is later than the time stamp on the Smart Client, then the server has more up-to-date data than the client. If the time stamp on the server and the time stamp on the client match, then the data on the client is the same as the server or the data on the client is more up-to-date than the server. If the data on the client is the same as the server, then the data would not be dirty and would not be sent for synchronization. Thus, any data received from the client that has the same time stamp as the server is assumed to be updated data that needs to be updated on the server. If the record being sent for synchronization from the client corresponds to a record on the server that has also been updated, then there is a conflict and the record on the server is not updated. Rather, the record on server is used to overwrite the record on the Smart Client.

FIG. 21 includes a flowchart that describes additional steps performed for activities in regard to associations between activities and contacts and/or associations between activities opportunities. In one embodiment, the process of FIG. 21 can be performed as part of step 758 of FIG. 18. In some (but not all) scenarios, prior to the process of FIG. 21 commencing, a new activity is created (and stored), and a new opportunity or contact is created (and stored). The new opportunity or contact is associated with the new activity, by storing the LocalID of the new opportunity or contact in the object for the new activity.

In step 900 of FIG. 21, it is determined whether the activity data item is new. If it is not, then the activity item is updated in step 902 as discussed above. If it is new, than various steps 906-926 may be performed prior to the updating of the activity. In step 906, it is determined whether the activity is associated with an opportunity. If not, then it is determined whether the activity is associated with any contact. If it is not associated with an activity or a contact, then the activity is updated as discussed above.

If the activity is associated with an opportunity (step 906), then it is determined whether the opportunity is new in step 908. If the opportunity is new, then the opportunity is synchronized in step 910. As part of the synchronization process, a ServerID will be received and stored for that opportunity. In the activity object, the ServerID field for identifying the opportunity is updated with the ServerID received for the opportunity object during the synchronization of the opportunity object (step 912).

After step 912, the process continues at step 920, where it is determined whether the particular activity is associated with a contact. If it is associated with a contact, it then is determined in step 922 whether the contact is new. If the contact is not new, then the activity is updated in step 902. If the contact is new, then that contact is synchronized in step 924. As part of the synchronization process, a ServerID will be received and stored for that contact. In the activity object, the ServerID field for identifying the contact is updated with the ServerID received for the contact object during the synchronization of the contact object (step 926). After step 926, the activity is then updated in step 902 (using the ServerIDs for the opportunity and the contact).

Figure 22:
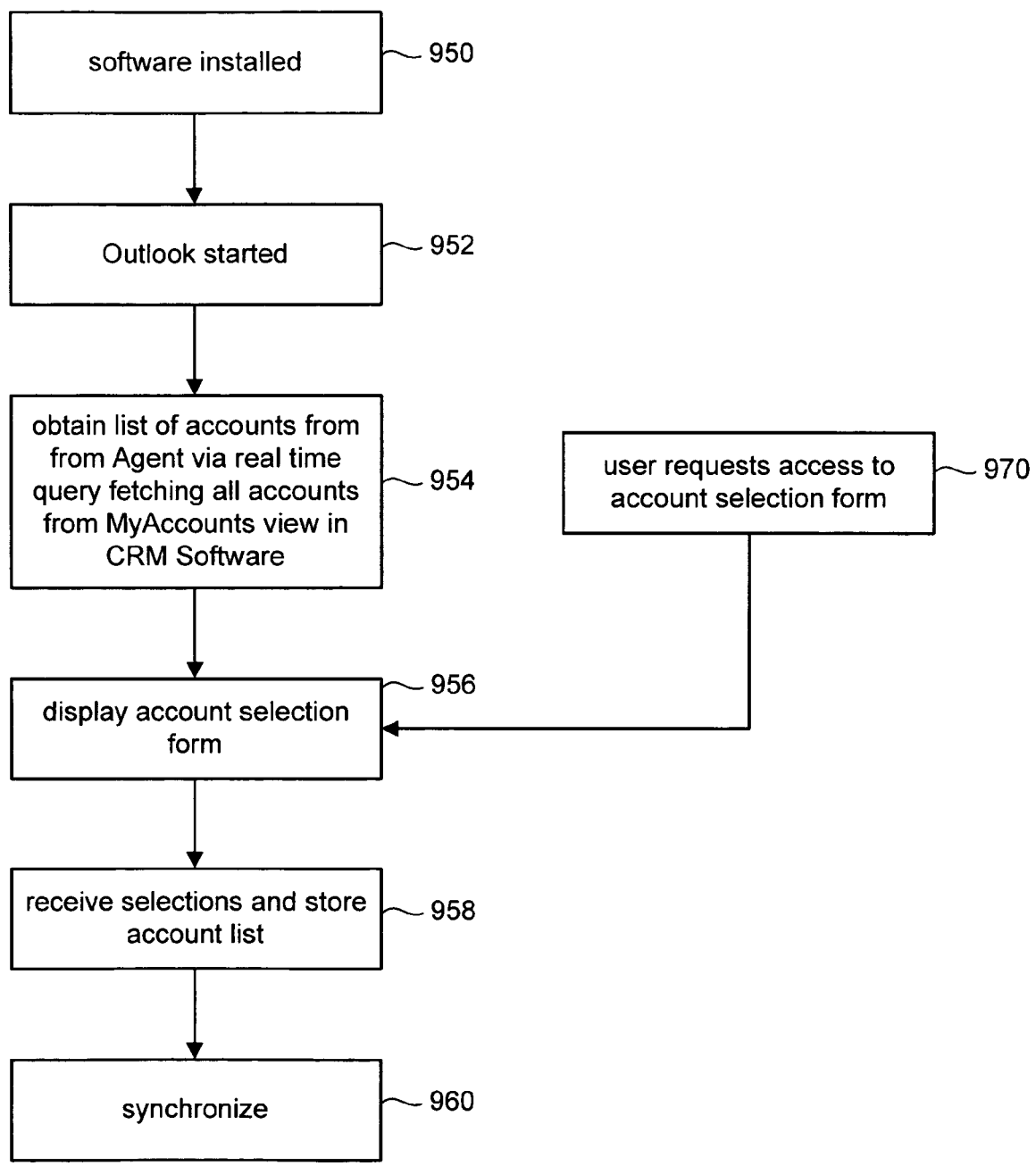
FIG. 22 is a flowchart describing one embodiment of a process that is performed when the list of accounts being accessed has changed.

FIG. 22 depicts a flowchart describing a process for installing Smart Client AddIn 360. In step 950, the software is installed on the client machine. In step 952, the Outlook® application is started. In step 954, Sync Manager 370 (via agent 372 and web services 302) obtains a list of accounts associated with the particular alias via a real-time query fetching of all accounts from the MyAccounts view in the CRM software. In step 956, that account list is displayed in an account selection form (e.g., pick list). The user can then select or deselect various accounts from that selection form. Those selections are received and stored as the account list (step 958). In step 960, a synchronization process is performed. Since this is the first time the synchronization is being performed, there is likely to be no transactional data on the Smart Client; therefore, data is down-synced from the client.

After installation and the initial synchronization, the user can then perform any of the functions described above. If, the user selects "MyCRM" from the top-level menu 10 and user chooses to change the account selection form (step 970), then the user will be provided with the account selection form in step 956. After the user makes the selections or de-selections of the various accounts, the new account list will be updated in step 958. The system will then synchronize in step 916, immediately after storing the new account list or the synchronization can be performed later as per the schedule based on the configuration data.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A computer implemented method for converting data, comprising:

receiving user input by a collaborative scheduling and messaging application to convert a data item having a first format for a CRM application to a second format for the collaborative scheduling and messaging application, the collaborative scheduling and messaging application is part of a smart client platform that includes a smart client add-in component, the collaborative scheduling and messaging application is used as a portal to the CRM application;

accessing a first data item having the first format;

converting said first data item to a second data item having the second format, said step of converting is performed by said smart client add-in and includes:

creating an object for the collaborative scheduling and messaging application in a data store that is associated with the collaborative scheduling and messaging application, objects stored in the data store are instantiated from classes in a namespace for the collaborative scheduling and messaging application, classes in a namespace for the smart client add-in aggregate classes in the collaborative scheduling and messaging application and correspond to objects in said CRM application, accessing relevant data in the first data item associated with the CRM application, automatically adding the accessed relevant data to the collaborative scheduling and messaging application object, adding default data to the collaborative scheduling and messaging application object, and allowing a user to edit the collaborative scheduling and messaging application object having the accessed relevant data and the default data; and storing said scheduling and messaging application object as the second data item in a data store associated with the collaborative scheduling and messaging application.

2. A computer implemented method according to claim 1, further comprising:

converting a third data item for said collaborative scheduling and messaging application to a fourth data item for said CRM application.

3. A computer implemented method according to claim 1, wherein:

said second data item for said collaborative scheduling and messaging application includes a reference to said first data item for said CRM application.

4. A computer implemented method according to claim 1, wherein:

said first data item is an opportunity object, an activity object or a contact object in a format associated with the CRM application.

5. A computer implemented method according to claim 1, wherein:

said second data item is a contact object or a calendar object in a format associated with the collaborative scheduling and messaging application.

6. A computer implemented method according to claim 1, wherein said step of adding default data includes adding data associated with an account for which the first data item associated with the CRM application is relevant to.

7. A computer implemented method according to claim 1, wherein:

said CRM application uses CRM data; and said first data item includes CRM data.

8. A computer implemented method according to claim 7, further comprising:

viewing and modifying CRM data from said smart client platform.

9. A computer implemented method according to claim 8, wherein:

using said smart client platform to access account data from one or more systems other than said CRM application, said account data pertains to an account in said CRM application associated with said first data item.

10. A computer implemented method for converting data, comprising:

receiving input through a collaborative scheduling and messaging application to convert a first data item comprising a collaborative scheduling and messaging application object to a second data item comprising a CRM object for an application platform;

accessing the first data item for a smart client platform, said smart client includes the collaborative scheduling and messaging application and an add-in component;

converting said first data item for said smart client platform to a second data item for an application platform, said step of converting performed by the smart client add-in and includes:

creating the CRM object in a smart client data store based on a namespace of the collaborative scheduling and messaging application, classes in a namespace for said add-in component aggregate classes in said collaborative scheduling and messaging application, said classes correspond to objects in said application platform, accessing relevant data in the collaborative scheduling and messaging application object comprising the first data item, automatically adding the accessed relevant data to the created CRM object, adding default data to the CRM object, and allowing a user to edit the CRM object containing the relevant data and the default data; and storing said second data item as the CRM object by the collaborative scheduling and messaging application in a data store associated with the collaborative scheduling and messaging application.

11. A computer implemented method according to claim 10, wherein:

said application platform corresponds to CRM system.

12. A computer implemented method according to claim 10, wherein:

said second data item includes a reference to said first data item.

13. A computer implemented method according to claim 11, further comprising:

synchronizing said second object with said CRM system after said converting.

14. A computer implemented method according to claim 10, wherein:

said application platform corresponds to CRM system;

said CRM system uses CRM data;

said second data item includes CRM data; and said method further includes viewing and modifying CRM data from said smart client platform.

15. One or more processor readable storage devices having processor readable code embodied on said processor readable storage devices, said processor readable code for programming one or more processors to perform a method comprising:

converting data items between an application platform and a smart client platform, the application platform corresponding to a CRM system, said smart client includes a collaborative scheduling and messaging application and an add-in, the collaborative scheduling and messaging application is used as a portal to the CRM system,
wherein the data items include a first data item comprising the source of the conversion and a second data item comprising the result of the conversion,
said step of converting performed by said smart client add-in and including:
creating the second data item in a data store that is part of the smart client, objects stored in said data store are instantiated from classes in a namespace for said collaborative scheduling and messaging application, classes in a namespace for said smart client add-in aggregate classes in said messaging and scheduling system and correspond to objects in the CRM system,
accessing relevant data in the first data item,
automatically adding the relevant data to the second item,
adding default data to the second item by the add-in, and
providing an interface allowing a user to edit the second data item; and
storing said second data item in a data store associated with the collaborative scheduling and messaging application.

16. One or more processor readable storage devices according to claim 15, wherein said converting comprises:
converting a first set of data items from said application platform to said smart client platform; and
converting a second set of data items from said smart client platform to said application platform.

17. One or more processor readable storage devices according to claim 16, wherein:
said first set of data items includes opportunities, activities and contacts; and
said second set of data items includes contacts and appointments.

18. One or more processor readable storage devices according to claim 16, wherein:
said first set of data items are objects in a smart client data store; and
said second set of data items are objects in said smart client data store.

19. One or more processor readable storage devices according to claim 15, wherein:
said CRM system uses CRM data; and
said data items includes CRM data.

20. One or more processor readable storage devices according to claim 19, wherein said method further comprises:
using said smart client platform as a portal to said CRM system in order to view and modify CRM data.

21. One or more processor readable storage devices according to claim 15, wherein:
said converting data items includes adding a reference in a newly created result data item to a source data item.

22. One or more processor readable storage devices having processor readable code embodied on said processor readable storage devices, said processor readable code for programming one or more processors, said processor readable code comprising:
first code, said first code implements a smart client acting as a portal to a CRM system, said smart client includes a collaborative scheduling and messaging application;
second code, said second code converts data items from a first format to a second format between said CRM system and said collaborative scheduling and messaging application, wherein each of said data items includes a reference to a corresponding data item from which it was converted, there are a plurality of different types of data items in said CRM system and a plurality of different types of data items in said collaborative scheduling and messaging application, at least one of said types of said CRM data items is allowed to be converted to more than one type of said types of collaborative scheduling and messaging application data items, and
third code that provides an interface for a user to select a data item to be converted from said first format for said CRM system to said second format for said collaborative scheduling and messaging application, said third code provides a selection of more than one type of data item in said collaborative scheduling and messaging application to which said selected CRM data item is allowed to be converted,
said second code converts said selected data item from said first format for said CRM system to said selected type of data item in said second format for said collaborative scheduling and messaging application.

23. An apparatus capable of converting data, comprising:
a storage device;
a communication interface; and
one or more processors in communication with said storage device and said communication interface, said one or more processors implement a smart client for interfacing with an application external to said apparatus, said smart client includes a collaborative scheduling and messaging application and an add-in component, said scheduling and messaging system performs as a portal to said external application in order to view and modify application data, said one or more processors capable of converting data items between said application associated with a first format and said smart client associated with a second format, the data items include a reference to a corresponding data item from which it was converted, said first set of data items are objects in a smart client data store in said storage device, said second set of data items are objects in said smart client data store in said storage device, objects stored in said smart client data store that represent the external application are instantiated from classes in a namespace for said collaborative scheduling and messaging application, classes in a namespace for said add-in component aggregate classes in said messaging and scheduling application and correspond to objects in said external application.

24. An apparatus according to claim 23, wherein:
said application external to said apparatus is part of a CRM system;
said CRM system uses CRM data;
said data items includes CRM data; and
said scheduling and messaging system communicates with said CRM system via said communication interface.

25. A computer implemented method as recited in claim 1, further comprising:
providing a selection of a plurality of different types of objects in said collaborative scheduling and messaging application to which said first data item is allowed to be converted;
receiving a selection of a first type of object of said plurality of objects; and
wherein said converting said first data item to said second data item includes converting said data item to said selected type of object.

26. A computer implemented method as recited in claim 10, further comprising:

providing a selection of a plurality of different types of objects in said application platform to which said data item is allowed to be converted;

receiving a selection of a first type of object of said plurality of objects; and wherein said converting said first data item to said second data item includes converting said data item to said selected type of object.

27. One or more processor readable storage devices as recited in claim 22, wherein:

said third code allows selection of a second data item in the interface to be converted from said second format for said collaborative scheduling and messaging application to said first format for said CRM system, said third code provides a selection of more than one type of data item in said CRM system to which said selected collaborative scheduling and messaging application data item is allowed to be converted, said second code converts said selected data item from said second format for said collaborative scheduling and messaging application to said selected type of data item in said first format for said CRM system.

* * * * *